(12) United States Patent
Futawatari et al.

(10) Patent No.: US 8,949,563 B2
(45) Date of Patent: *Feb. 3, 2015

(54) COMPUTER SYSTEM AND DATA MANAGEMENT METHOD

(71) Applicant: Hitachi, Ltd., Tokyo (JP)

(72) Inventors: Naoki Futawatari, Yokohama (JP); Yasutomo Yamamoto, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/089,936

(22) Filed: Nov. 26, 2013

(65) Prior Publication Data

US 2014/0089614 A1 Mar. 27, 2014

Related U.S. Application Data

(63) Continuation of application No. 13/203,692, filed as application No. PCT/JP2011/004363 on Aug. 1, 2011, now Pat. No. 8,612,704.

(51) Int. Cl.
*G06F 12/02* (2006.01)
*G06F 12/16* (2006.01)
*G06F 3/06* (2006.01)

(52) U.S. Cl.
CPC ............. *G06F 3/065* (2013.01); *G06F 3/061* (2013.01); *G06F 3/0649* (2013.01); *G06F 3/0665* (2013.01); *G06F 3/0685* (2013.01); *G06F 3/0614* (2013.01); *G06F 3/0683* (2013.01); *G06F 3/0605* (2013.01)
USPC ............. 711/162; 711/170; 711/E12.002; 711/E12.103

(58) Field of Classification Search
USPC ............. 711/162, 170, E12.002, E12.103
See application file for complete search history.

(56) References Cited

U.S. PATENT DOCUMENTS

| | | |
|---|---|---|
| 7,949,637 B1 | 5/2011 | Burke |
| 8,566,549 B1 | 10/2013 | Burke et al. |
| 2005/0228802 A1 | 10/2005 | Kezuka et al. |
| 2007/0239803 A1 | 10/2007 | Mimatsu |
| 2007/0283090 A1 | 12/2007 | Kaji et al. |
| 2010/0235597 A1 | 9/2010 | Arakawa |
| 2010/0274825 A1 | 10/2010 | Nemoto et al. |
| 2011/0082988 A1 | 4/2011 | Kono et al. |
| 2011/0320754 A1 | 12/2011 | Ichikawa et al. |

FOREIGN PATENT DOCUMENTS

| | | |
|---|---|---|
| EP | 1840723 A2 | 10/2007 |
| JP | 2007-265403 A | 10/2007 |
| JP | 2007-328468 A1 | 12/2007 |
| JP | 2010-257095 A | 11/2010 |
| JP | 2011-081467 A | 4/2011 |

*Primary Examiner* — Yong Choe
(74) *Attorney, Agent, or Firm* — Volpe and Koenig, P.C.

(57) ABSTRACT

A first storage system copies data of a virtual area of a first virtual volume to a virtual area of a second virtual volume of a second storage system, monitors accesses with respect to multiple virtual areas of the first virtual volume, updates access information related to the accesses of the multiple virtual areas, and, based on the access information, reallocates data inside an actual area of a first pool allocated to the virtual area of the first virtual volume. The first storage system sends the access information to the second storage system. The second storage system receives the access information, and, based on the access information, reallocates data inside the actual area allocated to a virtual area of the second virtual volume.

19 Claims, 16 Drawing Sheets

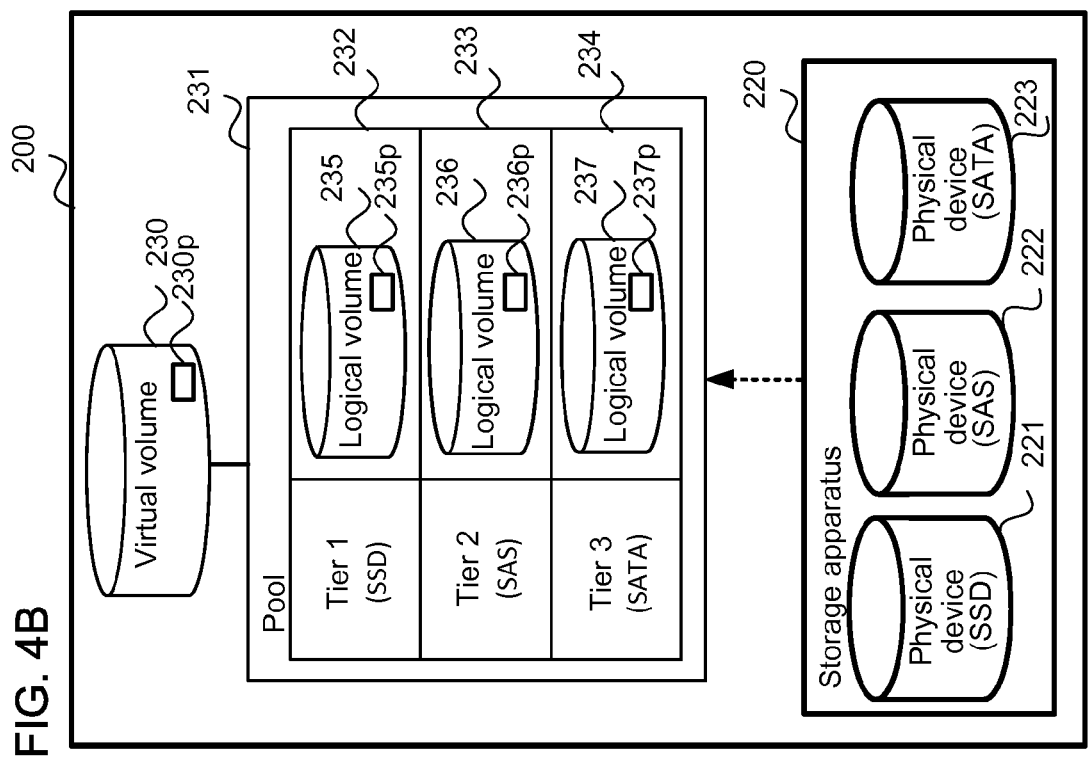
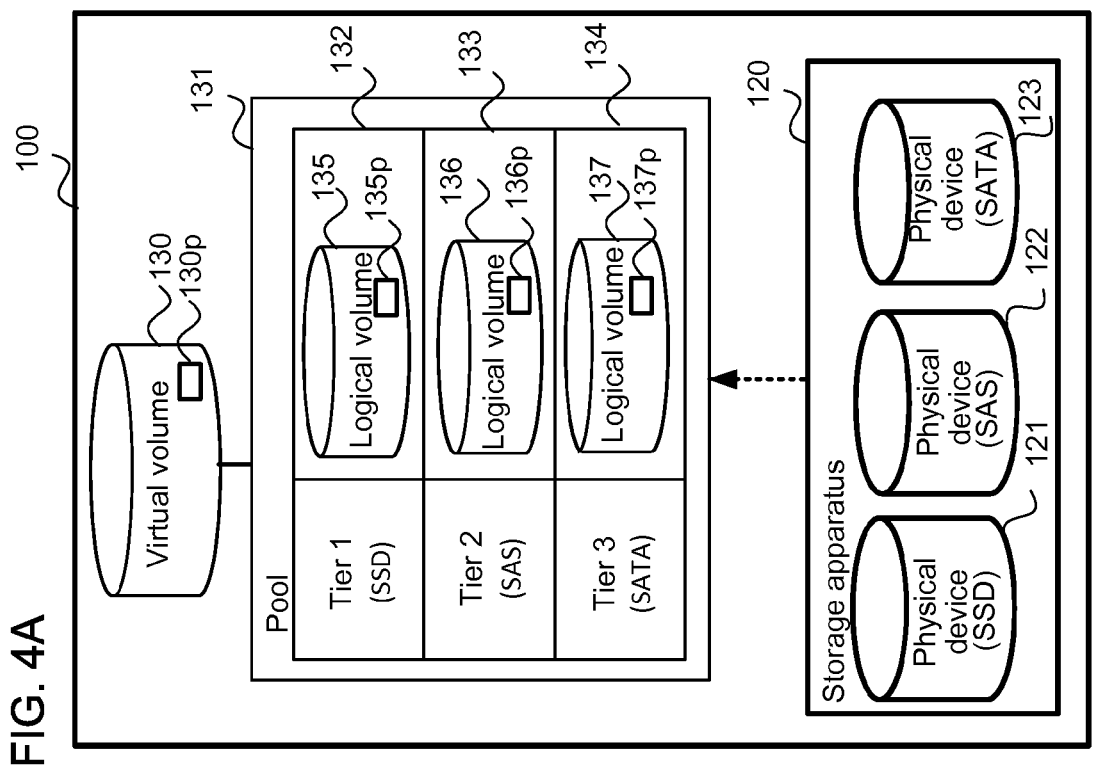

FIG. 6A

Pair management table 1171

| Primary volume | | Secondary volume | | Pair status |
|---|---|---|---|---|
| Storage ID | Virtual volume ID | Storage ID | Virtual volume ID | |
| 01 | VOL01 | 02 | VOL21 | PAIR |
| 01 | VOL02 | 02 | VOL22 | PSUS |
| 01 | VOL03 | 02 | VOL23 | PAIR |
| 01 | VOL04 | 02 | VOL24 | PAIR |
| ⋮ | ⋮ | ⋮ | ⋮ | ⋮ |

Ranking information table 1172

| Virtual volume ID | Virtual page number | Ranking information |
|---|---|---|
| VOL01 | 1 | 1 |
| | 2 | 10 |
| | 3 | 5 |
| | 4 | 8 |
| | ⋮ | ⋮ |
| VOL02 | 1 | 2 |
| | 2 | 4 |
| | 3 | 8 |
| | ⋮ | ⋮ |
| ⋮ | ⋮ | ⋮ |

1172a, 1172b, 1172c

FIG. 7A Monitoring information table

| Virtual volume ID (1173a) | Virtual page number (1173b) | Monitoring information (number of I/Os) (1173c) | New page flag (1173d) |
|---|---|---|---|
| VOL01 | 1 | 1000 | 0 |
|  | 2 | 500 | 0 |
|  | 3 | 800 | 0 |
|  | 4 | 600 | 0 |
|  | 5 | — | 1 |
|  | ⋮ | ⋮ | ⋮ |
| VOL02 | 1 | 980 | 0 |
|  | 2 | 950 | 0 |
|  | 3 | 600 | 0 |
|  | 4 | 20 | 2 |
|  | 5 | — | 1 |
|  | ⋮ | ⋮ | ⋮ |
| ⋮ | ⋮ | ⋮ | ⋮ |

FIG. 7C I/O information collection table

| Virtual volume ID (1174a) | Virtual page number (1174b) | Monitoring information (number of I/Os) (1174c) |
|---|---|---|
| VOL01 | 1 | 1000 |
|  | 2 | 500 |
|  | 3 | 800 |
|  | 4 | 600 |
|  | 5 | — |
|  | ⋮ | ⋮ |
| VOL02 | 1 | 980 |
|  | 2 | 950 |
|  | 3 | 600 |
|  | 4 | 20 |
|  | 5 | — |
|  | ⋮ | ⋮ |
| ⋮ | ⋮ | ⋮ |

FIG. 8A
Page tier information table 1175

| Virtual volume ID | Virtual page number | Storage tier |
|---|---|---|
| VOL01 | 1 | 1 |
| | 2 | 2 |
| | 3 | 2 |
| | 4 | 2 |
| | 5 | 1 |
| | ⋮ | ⋮ |
| VOL02 | 1 | 1 |
| | 2 | 1 |
| | 3 | 2 |
| | 4 | 1 |
| | 5 | 2 |
| | ⋮ | ⋮ |
| ⋮ | ⋮ | ⋮ |

FIG. 8B
Pool ranking management table 1176

| Storage tier | Start ranking number | End ranking number | Number of pages per ranking |
|---|---|---|---|
| 1 | 1 | 4 | 4 |
| 2 | 5 | 16 | |
| 3 | 17 | 20 | |

FIG. 8C
Difference information table 1177

| Virtual volume ID | Virtual page number | New difference page flag |
|---|---|---|
| VOL02 | 3 | OFF |
| | 4 | ON |
| | 5 | ON |

FIG. 9A

Virtual volume management table 1178

| Virtual volume ID | Virtual page number | Page ID |
|---|---|---|
| VOL01 | 1 | P000 |
| | 2 | P101 |
| | 3 | Unallocated |
| | 4 | P120 |
| | 5 | P021 |
| | ⋮ | ⋮ |
| VOL02 | 1 | P002 |
| | 2 | P004 |
| | 3 | P112 |
| | 4 | P024 |
| | 5 | P130 |
| | ⋮ | ⋮ |
| ⋮ | ⋮ | ⋮ |

FIG. 9B

Logical volume management table 1179

| Logical volume ID | Logical page number | Page ID | Status |
|---|---|---|---|
| Logical VOL01 (SSD) | 1 | P000 | Allocated |
| | 2 | P001 | Unallocated |
| | 3 | P002 | Allocated |
| | 4 | P003 | Allocated |
| | 5 | P004 | Allocated |
| | ⋮ | ⋮ | ⋮ |
| Logical VOL02 (SAS) | 1 | P100 | Allocated |
| | 2 | P101 | Allocated |
| | 3 | P102 | Allocated |
| | 4 | P103 | Unallocated |
| | 5 | P104 | Allocated |
| | ⋮ | ⋮ | ⋮ |
| Logical VOL03 (SATA) | ⋮ | ⋮ | ⋮ |

COMPUTER SYSTEM AND DATA MANAGEMENT METHOD

CROSS-REFERENCE TO RELATED APPLICATION

This application is a continuation of U.S. patent application Ser. No. 13/203,692 filed Aug. 26, 2011, which claims priority from PCT/JP2011/004363 filed Aug. 1, 2011, all of which are incorporated by reference as if fully set forth.

TECHNICAL FIELD

The present invention relates to a computer system, which comprises multiple storage systems comprising virtual volumes, and a data management method of the computer system.

BACKGROUND ART

The virtualization of storage capacity (Thin Provisioning (also called Dynamic Provisioning)) is known as a technology for reducing storage management costs and simplifying management. Storage capacity virtualization technology is for providing a host with a virtual volume, and providing an actual area from an actual capacity pool when a write from the host occurs.

Also, the virtualization of storage hierarchies (may be called "Dynamic Tiering") is known as a technology for lessening the burden on a storage performance design. Storage hierarchy virtualization technology is for moving (reallocating) a frequently accessed page to a high-performance storage tier, and moving (reallocating) an infrequently accessed page to a low-performance storage tier.

Disaster recovery technology is known as preventive measures for recovering from a system failure caused by a disaster, and minimizing disaster-related damage. Disaster recovery is a technology, which backs up all data and systems at a remote site (secondary site) which is physically separate from a main site (primary site), and restores business operations at the remote site when a failure occurs at the main site.

Furthermore, technology for collectively controlling the migration of a relevant source volume and a relevant destination volume with respect to a related volume pair is known as volume copying technology (for example, refer to Patent Literature 1). Also, technology for maintaining storage-destination tiers for storing files in accordance with a primary-side storage system and a secondary-side storage system has been disclosed as technology for copying between multiple storage systems (for example, refer to Patent Literature 2).

CITATION LIST

Patent Literature

[PTL 1]
Japanese Patent Application Laid-open No. 2011-81467
[PTL 2]
Japanese Patent Application Laid-open No. 2007-265403

SUMMARY OF INVENTION

Technical Problem

The technologies of Patent Literature 1 and Patent Literature 2 make it possible to bring the storage tiers of a primary volume and a secondary volume in line with requirements immediately following the implementation of a copy/migration.

However, the problem is that when Dynamic Tiering is applied to a storage system, the storage tiers of the primary volume and the secondary volume will differ following a copy/migration. That is, when Dynamic Tiering is applied to the main site storage system, each page of a virtual volume of the main site storage system is reallocated to an appropriate tier in accordance with the access frequency from the host. Alternatively, since a write access from the main site is only generated for copying a page of the main site virtual volume even when Dynamic Tiering is applied to the remote site storage system, the allocation of a page of a virtual volume in the remote site will differ greatly from the allocation of a page of the main site virtual volume.

With the foregoing in mind, an object of the present invention is to provide a technology that is able to appropriately bring a virtual volume page allocation of a copy-destination storage system into close approximation with a virtual volume page allocation corresponding to a copy-source storage system.

Solution to Problem

A computer system related to one aspect of the present invention comprises a first storage system coupled to a host, and a second storage system coupled to the first storage system.

The first storage system includes a first pool, a first virtual volume, and a first controller. The first pool is configured from multiple first actual areas based on multiple first physical storage devices having different performances, and each of the first actual areas is sorted into any of multiple storage tiers in accordance with the performance of the first physical storage device. The first virtual volume is a virtual logical volume that conforms to Thin Provisioning and is configured from multiple first virtual areas. The first controller receives a write request from the host, allocates a first actual area to the write-destination first virtual area that conforms to the write request, writes the write-target data conforming to the write request to the first actual area, and updates access information related to accesses with respect to the multiple first virtual areas. The second storage system includes a second pool, a second virtual volume, and a second controller. The second pool is configured from multiple second actual areas based on multiple second physical storage devices having different performances, and each of the second actual areas is sorted into any of multiple storage tiers in accordance with the performance of the second physical storage devices. The second virtual volume is a virtual logical volume that conforms to Thin Provisioning and is configured from multiple second virtual areas. The second controller controls the allocation of the second actual area to a second virtual area, and is coupled to the first controller.

The first controller:
(A) copies data inside a first actual area that has been allocated to a first virtual area, to the second virtual area;
(B) carries out a first reallocation process for reallocating data inside the first actual area allocated to the first virtual area to a first actual area of a different storage tier from the storage tier of this first actual area based on access information, and for allocating this reallocation-destination first actual area to this first virtual area instead of the reallocation-source first actual area; and
(C) sends the access information to the second storage system.

The second controller:

(a) allocates a second actual area to the copy-destination second virtual area in the above (A), and writes copy-target data from the first controller to the allocated second actual area;

(b) receives the access information sent in the above (C); and (c) carries out a second reallocation process for reallocating the data inside the second actual area allocated to the second virtual area to a second actual area of a different storage tier from the storage tier of this second actual area based on the access information, and for allocating this reallocation-destination second actual area to this second virtual area instead of the reallocation-source second actual area.

BRIEF DESCRIPTION OF DRAWINGS

FIG. 4A is a diagram illustrating the virtual volume and pool of a main site storage system related to an embodiment of the present invention; and FIG. 4B is a diagram illustrating the virtual volume and pool of a remote site storage system related to an embodiment of the present invention.

FIG. 6A is a diagram showing an example of the configuration of a pair management table; and FIG. 6B is a diagram showing an example of the configuration of a ranking information table.

FIG. 7A is a diagram showing an example of the configuration of a monitoring information table; FIG. 7C is a diagram showing an example of the configuration of an I/O information collection table.

FIG. 8A is a diagram showing an example of the configuration of a page tier information table; FIG. 8B is a diagram showing an example of the configuration of a pool ranking management table; and FIG. 8C is a diagram showing an example of the configuration of a difference information table.

FIG. 9A is a diagram showing an example of the configuration of a virtual volume management table; and FIG. 9B is a diagram showing an example of the configuration of a logical volume management table.

DESCRIPTION OF EMBODIMENTS

Figure 1:
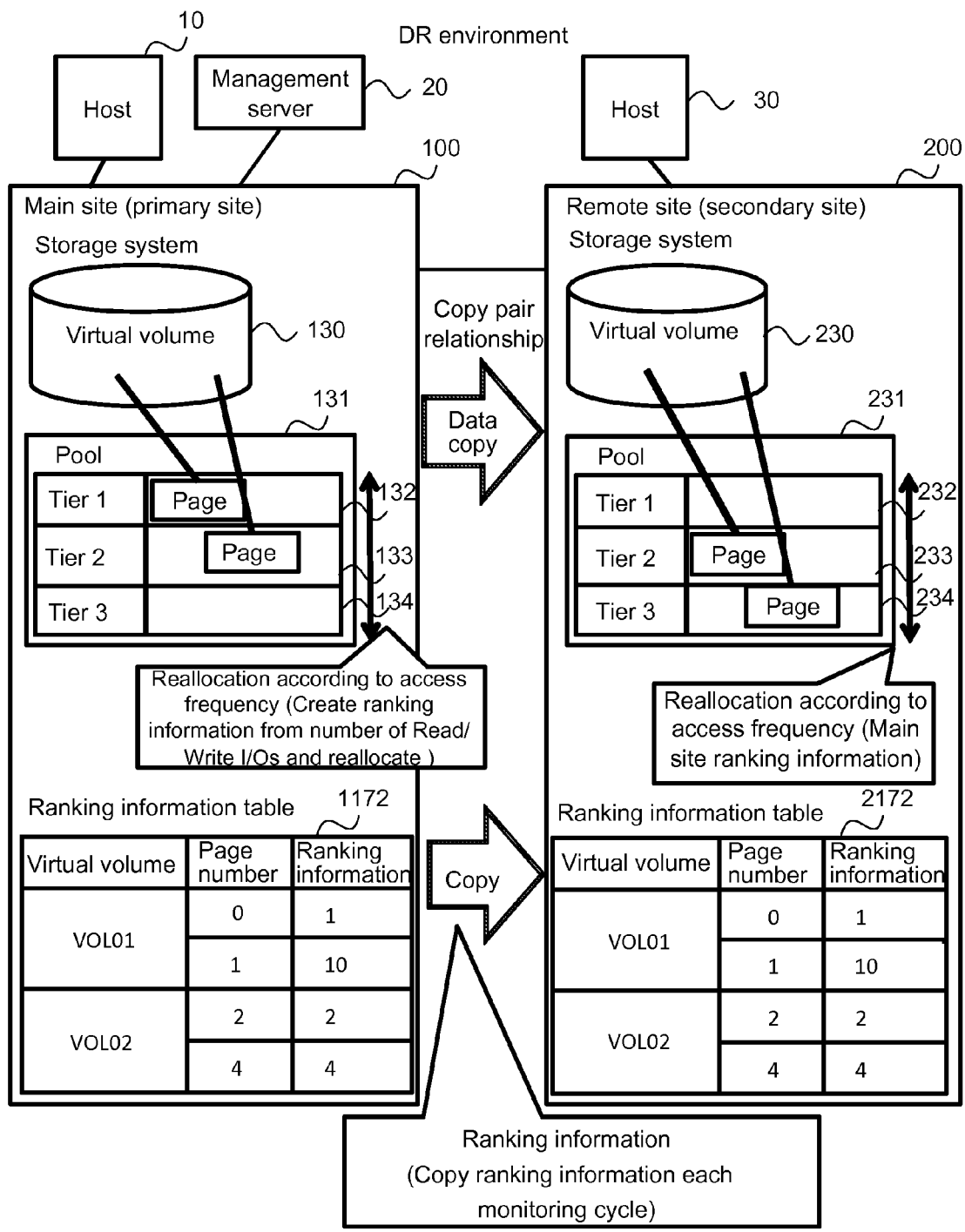
FIG. 1 is a diagram illustrating an overview of an embodiment of the present invention.

The embodiment of the present invention will be explained by referring to the drawings. Furthermore, the embodiment explained hereinbelow does not limit the invention set forth in the claims, and all of the elements and combinations thereof described in the embodiment are not necessarily essential as means of the invention for solving the problem.

Furthermore, in the following explanation, various types of information may be explained using the expression "xxx table", but the various information may also be expressed using a data structure other than a table. To show that the various information is not dependent on the data structure, "xxx table" can be called "xxx information".

Also, in the following explanation, there may be cases where processing is explained having a "program" as the subject of the sentence, but since the stipulated processing is performed in accordance with a program being executed by a processor (for example, a CPU (Central Processing Unit)) included in a controller while using a storage resource (for example, a memory) and/or a communication interface device (for example, an I/F) as needed, the processor may also be used as the subject of the processing. A process, which is explained using the program as the subject of the sentence, may be regarded as a process performed by the processor or a system (for example, a storage system) comprising this processor. Furthermore, the controller may be the processor itself, and may comprise a hardware circuit that carries out either part or all of the processing performed by the controller. A program may be installed in respective controllers from a program source. The program source, for example, may be either a program delivery server or a storage medium.

First of all, an overview of an embodiment of the present invention will be explained.

FIG. 1 is a diagram illustrating an overview of the embodiment of the present invention.

A virtual volume 130 is managed in a storage system 100 of a main site (primary site). An actual page of a pool 131 is allocated to a virtual page of the virtual volume 130. Multiple actual pages are sorted to tiers 132 through 134 (tier 1, tier 2, tier 3) in the pool 131 in accordance with the performance of the physical storage device providing the actual page. In this embodiment, tier 1, tier 2, and tier 3 are ranked in descending order of performance. For example, performance as used here is either the data I/O speed, or the data I/O response time.

A virtual volume 230 is managed in a storage system 200 of a remote site (secondary site). An actual page of a pool 231 is allocated to a virtual page of the virtual volume 230. Multiple actual pages are sorted to tiers 232 through 234 (tier 1, tier 2, tier 3) in the pool 231 in accordance with the performance of the physical storage device providing the actual page. In this embodiment, tier 1, tier 2, and tier 3 are ranked in descending order of performance.

It is supposed here that the virtual volume 130 of the storage system 100 and the virtual volume 230 of the storage system 200 are in a copy pair relationship. That is, a virtual page of the virtual volume 130 is copied to a virtual page corresponding to the virtual volume 230.

In the storage system 100, the reallocation of an actual page to be allocated to a virtual page is carried out in accordance with the access frequency with respect to the virtual page of the virtual volume 130. In this embodiment, an access frequency ranking (ranking number) with respect to a virtual page is decided based on the number of I/Os (number of reads/writes) with respect to the virtual page, and the virtual page ranking number (ranking information) is stored in a ranking information table 1172. The larger the number of I/Os here, the higher the ranking (the smaller the ranking number) becomes. The storage system 100 decides an actual page to be allocated to a virtual page based on the ranking information of the ranking information table 1172, and reallocates the actual page to the virtual page such that an actual page of a higher-performance tier is allocated with respect to a higher ranking (a lower ranking number). The access performance of the virtual volume 130 of the storage system 100 is enhanced in accordance with this.

In addition, in this embodiment, a ranking information table 2172 is created in the storage system 200 by copying ranking information including ranking number and information for identifying a virtual page of the virtual volume 130 stored in the ranking information table 1172, for example, from the storage system 100 to the storage system 200 each monitoring cycle for monitoring the number of I/Os.

Next, in the storage system 200, an actual page to be allocated to a virtual page corresponding to the virtual volume 230 is decided based on ranking information corresponding to the virtual page of the virtual volume 130 of the ranking information table 2172, and the reallocation of the actual page to the virtual page is carried out such that an actual page of a higher-performance tier is allocated with respect to a higher ranking (a smaller ranking number).

In accordance with this, the allocation of an actual page to a virtual page of the virtual volume 230 in the remote site storage system 200 can either be made the same as the allocation of an actual page to a virtual page of the virtual volume 130 in the main site storage system 100, or made to approximate this allocation.

Ranking information including a smaller amount of information than the amount of information of the number of I/Os was sent as an example of the access frequency without sending the number of I/Os per page, but the reallocation of an actual page to a virtual page may be executed based on the number of I/Os in accordance with the remote site storage system 200 by sending the number of I/Os per page as-is. Furthermore, access-related information (access information) with respect to a virtual page is not limited to the access frequency, and, for example, last access time information with respect to the virtual page may be sent to the remote site storage system 200, and based on the last access time information, for example, an actual page of a high performance tier may be preferentially allocated from a virtual page for which the last access time is the most recent.

Next, the rankings in this embodiment will be explained.

Figure 2A:
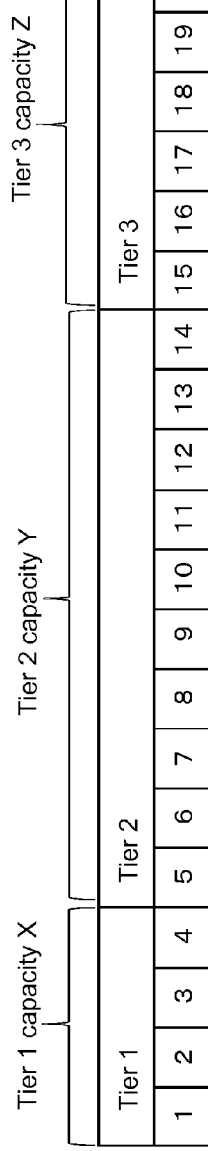
FIG. 2A is a diagram illustrating an example of the relationship between rankings and pool tiers in a main site storage system related to an embodiment of the present invention.
Figure 2B:
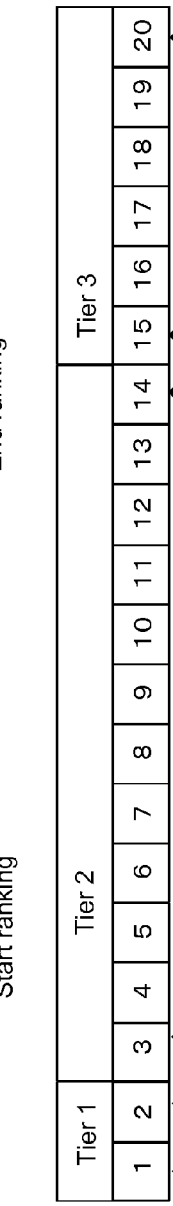
FIG. 2B is a diagram illustrating an example of the relationship between rankings and pool tiers in a remote site storage system related to an embodiment of the present invention.
Figure 2C:
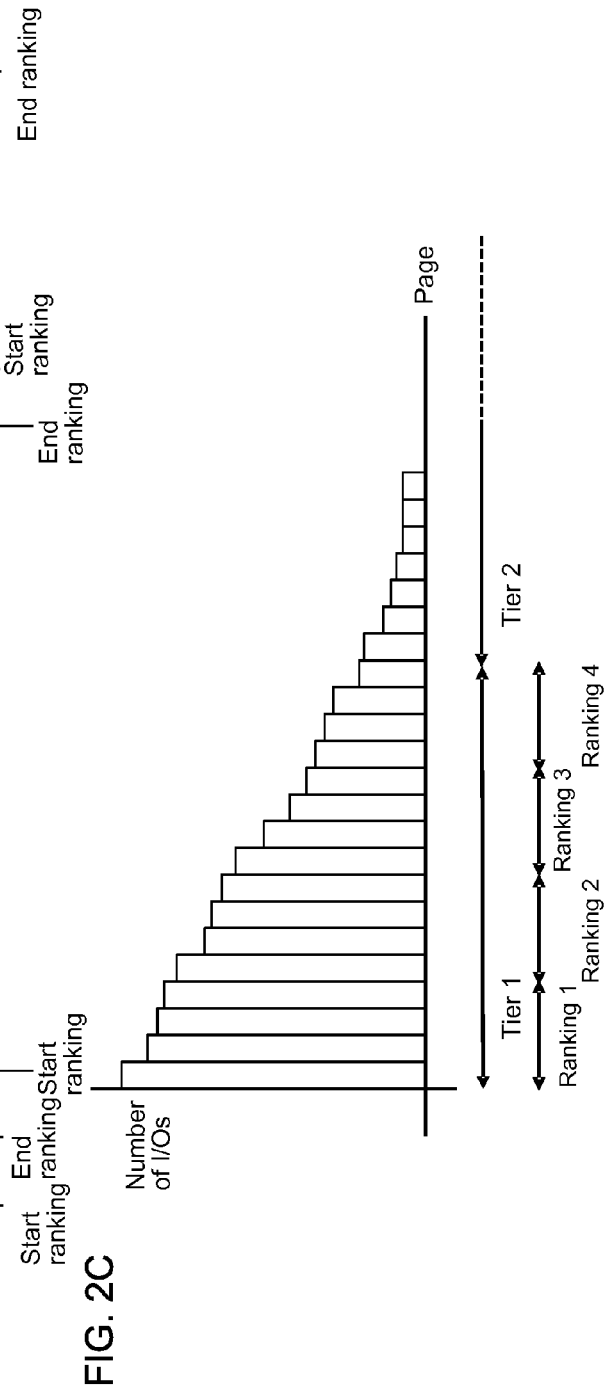
FIG. 2C is a diagram illustrating page rankings related to an embodiment of the present invention.

FIG. 2A is a diagram illustrating an example of the relationship between rankings and pool tiers in a main site storage system related to the embodiment of the present invention. FIG. 2B is a diagram illustrating an example of the relationship between rankings and pool tiers in a remote site storage system related to the embodiment of the present invention. FIG. 2C is a diagram illustrating page rankings related to the embodiment of the present invention.

In this embodiment, the total capacity of all the tiers in the pool is partitioned by the number of assumed rankings (for example, 20 in FIGS. 2A and 2B), and a prescribed number of pages (one or more) is allocated to each ranking. It is preferable here that the total capacity of a virtual page allocated to one ranking be equal to or less than the capacity of each tier, and that multiple rankings be allocated to each tier. In so doing, even in a case where the capacity of each tier differs in accordance with the main site storage system 100 and the remote site storage system 200, an actual page can be appropriately reallocated to a virtual page in accordance with the access frequency. For example, even in a case where the capacity of the highest performance tier in the remote site storage system 200 is smaller than the capacity of the highest performance tier at the main site, it is possible to appropriately reallocate an actual page with respect to a low access frequency (low ranking) virtual page to a lower-level tier.

The pool 131 of the main site storage system 100, for example, is partitioned into 20 rankings as shown in FIG. 2A. Virtual pages (strictly speaking, the data inside the virtual pages) with rankings of 1 through 4 are stored in tier 1 of the pool 131, virtual pages with rankings of 5 through 14 are stored in tier 2, and virtual pages with rankings of 15 through 20 are stored in tier 3. A prescribed number of (for example, four) virtual pages is allocated to each ranking.

The pool 231 of the remote site storage system 200, for example, is partitioned into 20 rankings (similar to the main site pool 131) as shown in FIG. 2B. Virtual pages with rankings of 1 and 2 are stored in tier 1 of the pool 231, virtual pages with rankings of 3 through 14 are stored in tier 2, and virtual pages with rankings of 15 through 20 are stored in tier 3. A prescribed number of virtual pages (for example four, the same as the main site) is allocated to each ranking. A virtual page of a certain ranking of the main site storage system 100 is stored in an actual page of a tier corresponding to the same ranking of the remote site storage system 200. For example, a virtual volume 230 virtual page corresponding to a virtual page with a ranking of 3 stored in tier 1 of the main site storage system 100 is stored in an actual page of tier 2 corresponding to a ranking of 3 in the storage system 200. In this embodiment, since an actual page is allocated to a virtual page based on a ranking rather than the number of the tier, an actual page can be appropriately allocated to a virtual page in accordance with a ranking, and an actual page can be appropriately allocated to a virtual page in accordance with the access frequency.

In this embodiment, as shown in FIG. 2C, the virtual pages are arranged in descending order from the largest number of I/Os, and rankings are assigned in order from the beginning. In this embodiment, the same ranking is assigned per each four pages, and a ranking of 1 is assigned to virtual pages with the first through the fourth largest numbers of I/Os, a ranking of 2 is assigned to virtual pages with the fifth through the eighth largest numbers of I/Os, and rankings are similarly assigned to each virtual page thereafter. In the main site storage system 100 of this embodiment, actual pages of the tier 1 are allocated to virtual pages with rankings of 1 through 4. Furthermore, in the remote site storage system 200, actual pages of the tier 1 are allocated to virtual pages with rankings of 1 and 2, and actual pages of the tier 2 are allocated to virtual pages with rankings 3 and 4.

Figure 3:
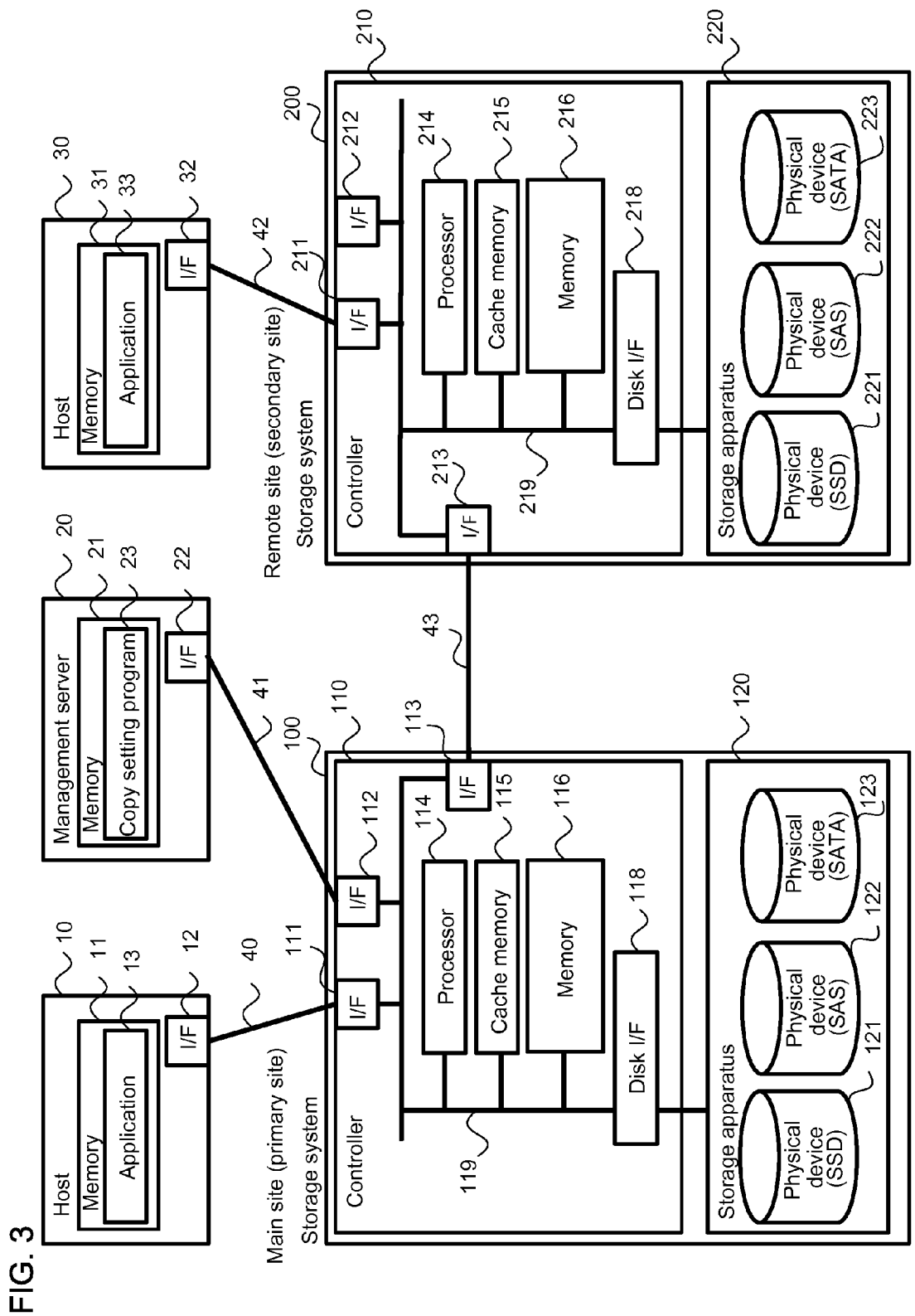
FIG. 3 is a block diagram of a computer system related to an embodiment of the present invention.

FIG. 3 is a block diagram of a computer system related to the embodiment of the present invention.

A computer system comprises a host computer (host) 10, a management server 20, a host computer 30, a storage system 100 as an example of a first storage system, and a storage system 200 as an example of a second storage system. The storage system 100 is disposed in a main site (primary site), the storage system 200 is disposed in a remote site (secondary site), which is physically separate from the main site, and a so-called disaster recovery environment is constructed. The main site and the remote site, for example, may be separated by 100 km or more. The main site side may be referred to as the primary side here, and the remote site side may be referred to as the secondary side.

The host 10 and the storage system 100 are coupled via a communication network (for example, a SAN (Storage Area Network)) 40. The management server 20 and the storage system 100 are coupled via a communication network (for example, a LAN (Local Area Network)) 41. The host 30 and the storage system 200 are coupled via a communication network (for example, a SAN (Storage Area Network)) 42. The storage system 100 and the storage system 200 are coupled via a communication network (for example, a WAN (Wide Area Network) 43.

The host 10 comprises a memory 11, and a I/F (interface) 12. The memory 11 stores a program, which is executed by a not-shown processor, and information that is required by the processor. For example, an application 13 for executing a prescribed business operation is stored in the memory 11, and by the processor executing the application 13, an I/O request (a read request or a write request) is sent to the storage system 100, access is carried out to a virtual page of the virtual volume of the storage system 100, and business processing is executed. A LUN (Logical Unit Number) and LBA (Logical Block Address) are included in the I/O request as the I/O destination information. The I/O-destination virtual volume and virtual page can be identified from the I/O-destination information. The I/F 12 relays communications between the host 10 and the storage system 100.

The host 30 is disposed on the remote site side, and comprises a memory 31 and an I/F (interface) 32. The memory 31 stores a program, which is executed by a not-shown processor, and information that is required by the processor. For example, an application 33 for executing a prescribed business operation is stored in the memory 31, and by the processor executing the application 33, an I/O request is sent to the storage system 200, access is carried out to a virtual page of the virtual volume of the storage system 200, and business processing is executed. The I/F 32 relays communications between the host 30 and the storage system 200. Furthermore, in this embodiment, the host 30 is used when a failure occurs at the main site.

The management server 20 comprises a memory 21 and a I/F 22. The memory 21 stores a program, which is executed by a not-shown processor, and information that is required by the processor. For example, a copy setting program 23 is stored in the memory 21, and in accordance with the not-shown processor executing the copy setting program 23, various copy settings with respect to the storage system 100 are controlled. The copy settings controlled by the management server 20 include a virtual volume setting for making a copy pair, a setting for splitting a copy pair, a copy pair resynchronization setting, and a copy pair deletion setting. The I/F 22 relays communications between the management server 20 and the storage system 100.

The storage system 100 comprises a controller 110 as an example of a first controller, and a storage apparatus 120.

The storage apparatus 120 comprises multiple physical storage devices featuring different performances 121, 122, and 123. The physical storage devices 121, 122 and 123 may each be multiple devices. The physical storage device 121 is a SSD (Solid State Drive). The physical storage device 122 is a SAS (Serial Attached SCSI)-HDD (Hard Disk Drive). The physical storage device 123 is a SATA (Serial ATA)-HDD. The physical storage device 121, the physical storage device 122, and the physical storage device 123 are arranged here in descending order of performance.

The controller 110 comprises a I/F 111, a I/F 112, a I/F 113, a processor 114, a cache memory 115, a memory 116, and a disk I/F 118. The I/F 111, the I/F 112, the I/F 113, the processor 114, the cache memory 115, the memory 116, and the disk I/F 118 are coupled via an internal bus 119. The I/F 111 relays communications between the host 10 and the storage system 100. The I/F 112 relays communications between the management server 20 and the storage system 100. The I/F 113 relays communications between the storage system 100 and the storage system 200. The disk I/F 118 carries out the exchange of data with the storage apparatus 120.

The cache memory 115 temporarily stores data to be written to the storage apparatus 120 and data to be read from the storage apparatus 120. The memory 116 stores a program, which is executed by the processor 114, and information that is required by the processor 114. The processor 114 performs various processes by executing a program stored in the memory 116. The specific processing by the processor 114 will be explained further below.

The storage system 200 comprises a controller 210 as an example of a second controller, and a storage apparatus 220.

The storage apparatus 220 comprises multiple physical storage devices featuring different performances 221, 222, and 223. The physical storage devices 221, 222 and 223 may each be multiple devices. The physical storage device 221 is a SSD (Solid State Drive). The physical storage device 222 is a SAS (Serial Attached SCSI)-HDD (Hard Disk Drive). The physical storage device 223 is a SATA (Serial ATA)-HDD. The physical storage device 221, the physical storage device 222, and the physical storage device 223 are arranged here in descending order of performance.

The controller 210 comprises a I/F 211, a I/F 212, a I/F 213, a processor 214, a cache memory 215, a memory 216, and a disk I/F 218. The I/F 211, the I/F 212, the I/F 213, the processor 214, the cache memory 215, the memory 216, and the disk I/F 218 are coupled via an internal bus 219. The I/F 211 relays communications between the host 30 and the storage system 200. The I/F 213 relays communications between the storage system 100 and the storage system 200. The disk I/F 218 carries out the exchange of data with the storage apparatus 220.

The cache memory 215 temporarily stores data to be written to the storage apparatus 220 and data to be read from the storage apparatus 220. The memory 216 stores a program, which is executed by the processor 214, and information that is required by the processor 214. The processor 214 performs various processes by executing a program stored in the memory 216. The specific processing by the processor 214 will be explained further below.

FIG. 4A is a diagram illustrating the virtual volume and the pool in the main site storage system related to the embodiment of the present invention. FIG. 4B is a diagram illustrating the virtual volume and the pool of the remote site storage system related to the embodiment of the present invention.

One or more virtual volumes (first virtual volumes) 130 and one or more pools (first pools) 131 are managed in the storage system 100. The pool 131 comprises multiple tiers (storage tiers) 132, 133, and 134. The smaller the tier number here, the higher the performance. Furthermore, the number of tiers in the pool 131 is not limited to three; there maybe two, or there may be more than three.

The tier 132 (tier 1) comprises one or more logical volumes (pool volumes) 135. The logical volume 135 comprises one or more actual pages (actual areas) 135p. The actual page 135p is configured from a storage area of the physical storage device 121 of the storage apparatus 120. The tier 133 (tier 2) comprises one or more logical volumes 136. The logical volume 136 comprises one or more actual pages 136p. The actual page 136p is configured from a storage area of the physical storage device 122 of the storage apparatus 120. The tier 134 (tier 3) comprises one or more logical volumes 137. The logical volume 137 comprises one or more actual pages 137p. The actual page 137p is configured from a storage area of the physical storage device 123 of the storage apparatus 120.

The virtual volume 130 comprises multiple virtual pages (virtual areas) 130p. An actual page of a logical volume of any tier in the pool 131 is allocated as needed to the virtual page 130p.

One or more virtual volumes (second virtual volumes) 230 and one or more pools (second pools) 231 are managed in the storage system 200. The pool 231 comprises multiple tiers 232, 233, and 234. The smaller the tier number here, the higher the performance. Furthermore, the storage capacities of the respective tiers 232, 233, and 234 need not be the same as the storage capacities of the same tiers in the storage system 100. Also, the number of pool tiers is not limited to three; there maybe two, or there may be more than three. Furthermore, the number of tiers in the pool 231 need not be the same number of tiers as the storage system 100.

The tier 232 (tier 1) comprises one or more logical volumes 235. The logical volume 235 comprises one or more actual pages 235p. The actual page 235p is configured from a storage area of the physical storage device 221 of the storage apparatus 220. The tier 233 (tier 2) comprises one or more logical volumes 236. The logical volume 236 comprises one or more actual pages 236p. The actual page 236p is configured from a storage area of the physical storage device 222 of the storage apparatus 220. The tier 234 (tier 3) comprises one or more logical volumes 237. The logical volume 237 comprises one or more actual pages 237p. The actual page 237p is configured from a storage area of the physical storage device 223 of the storage apparatus 220.

The virtual volume 230 comprises multiple virtual pages (virtual areas) 230p. An actual page of a logical volume of any tier in the pool 231 is allocated as needed to the virtual page 230p.

Figure 5A:
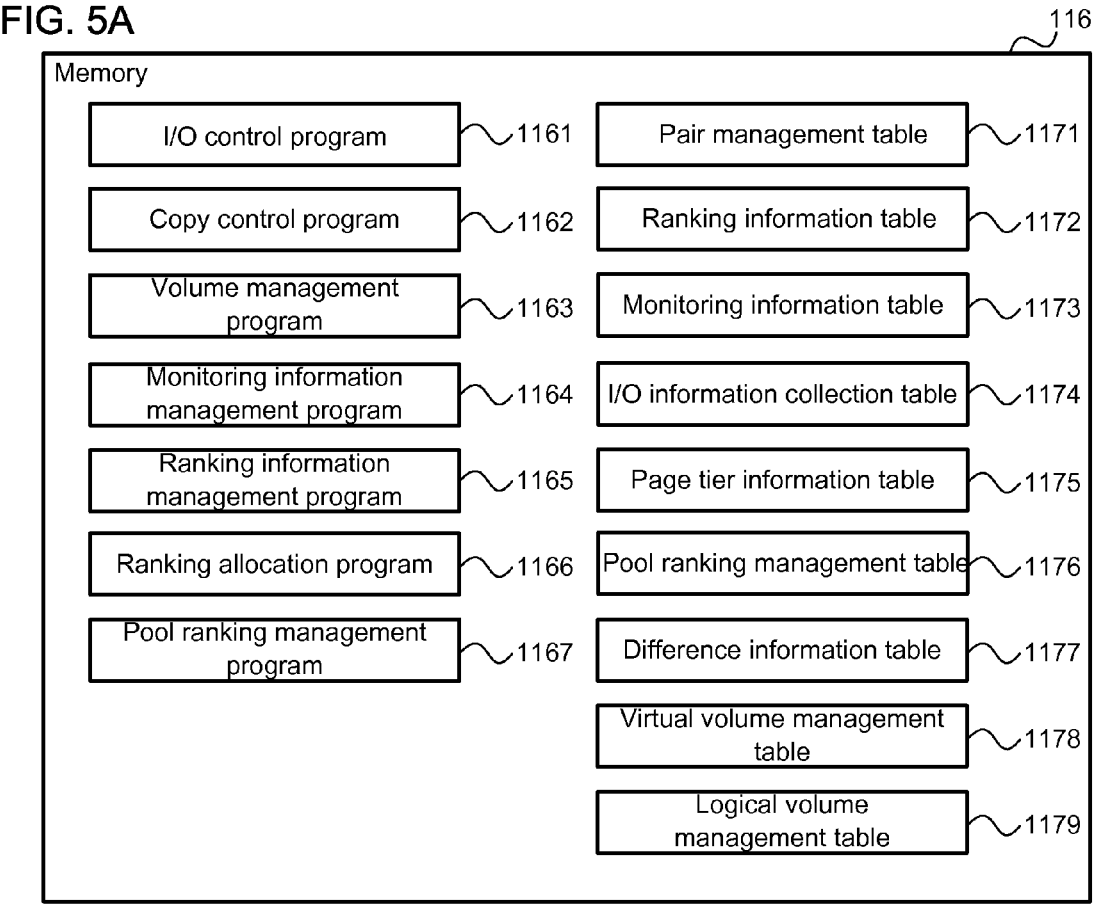
FIG. 5A is a diagram illustrating a memory 116 of a storage system 100.

FIG. 5A is a diagram illustrating the memory 116 of the storage system 100.

The memory 116 stores an I/O control program 1161, a copy control program 1162, a volume management program 1163, a monitoring information management program 1164, a ranking information management program 1165, a ranking allocation program 1166, a pool ranking management program 1167, a pair management table 1171, a ranking information table 1172, a monitoring information table 1173, an I/O information collection table 1174, a page tier information table 1175, a pool ranking management table 1176, a difference information table 1177, a virtual volume management table 1178, and a logical volume management table 1179.

The I/O control program 1161 is for executing an I/O process from the host 10 and so forth. The copy control program 1162 is for executing a process for sending copy-target data to the remote site in a case where the main site volume and the remote site volume are in a copy pair relationship. The volume management program 1163 is for executing a process for registering a copy pair setting based on an instruction from the management server 20, and a process for sending the copy pair setting information to the remote site. The monitoring information management program 1164 is for executing a process for updating monitoring information in the monitoring information table 1173 during the monitoring period. The ranking information management program 1165 is for executing a process for updating the ranking information of a virtual page and sending the ranking information to the remote site storage system 200 at each cycle of the monitoring period. The ranking allocation program 1166 is for allocating a ranking number to each virtual page at each cycle of the monitoring period. The pool ranking information program 1167 is for updating the pool ranking management table 1176 when a new logical volume is created or there is a configuration change in the pool.

The pair management table 1171 is for managing pair status in units of volumes. The ranking information table 1172 is for managing ranking information for each virtual page of each virtual volume. The monitoring information table 1173 is for storing monitoring information to be updated during each cycle of the monitoring period. The I/O information collection table 1174 is for counting the number of I/Os to a virtual page from the host 10 and so forth during the monitoring period. The page tier information table 1175 is for storing the tier of an actual page when a new actual page has been allocated from the pool to a virtual page. Furthermore, in a case where an actual page to be allocated to a virtual page in accordance with Dynamic Tiering has been reallocated, the post-reallocation tier is stored. The pool ranking management table 1176 is for managing the ranking(s) of each tier. The difference information table 1177 is for managing the difference information between a primary volume and a secondary volume, that is, a virtual page for which a copy to the secondary side from among updated virtual pages on the primary side has not been carried out. The virtual volume management table 1178 is for managing a virtual volume. The logical volume management table 1179 is for managing a logical volume (a pool volume).

Figure 5B:
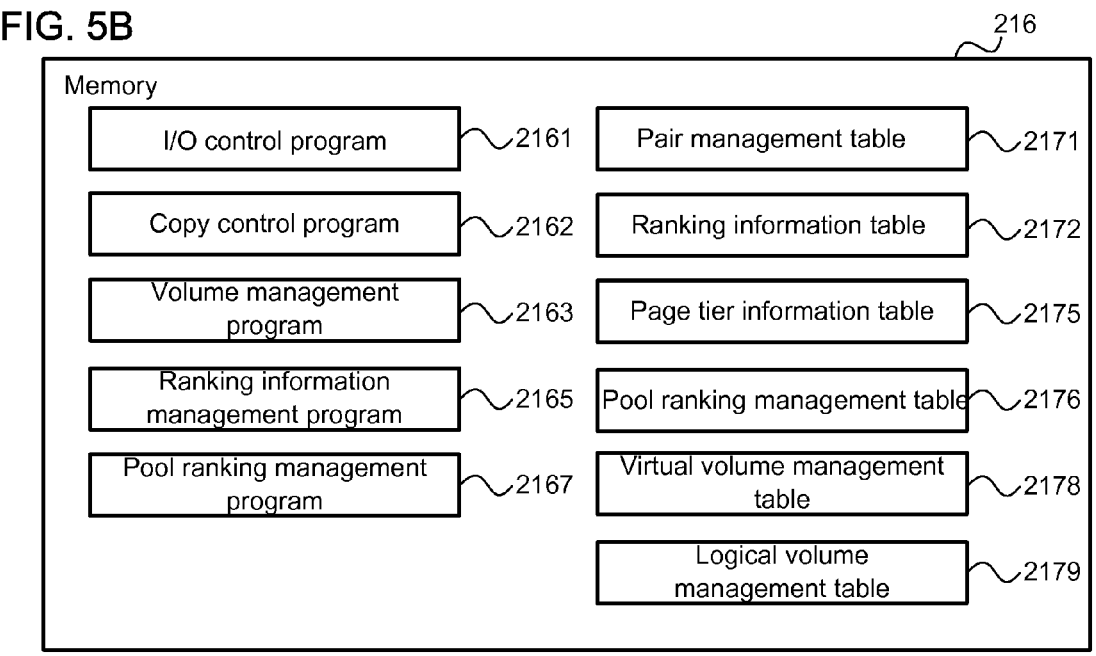
FIG. 5B is a diagram illustrating a memory 216 of a storage system 200.

FIG. 5B is a diagram illustrating the memory 216 of the storage system 200.

The memory 216 stores an I/O control program 2161, a copy control program 2162, a volume management program 2163, a ranking information management program 2165, a pool ranking management program 2167, a pair management table 2171, a ranking information table 2172, a page tier information table 2175, a pool ranking management table 2176, a virtual volume management table 2178, and a logical volume management table 2179.

The I/O control program 2161 is for executing an I/O process from the host 30 and so forth in a case where a failure has occurred at the main site and operations have switched over to the remote site. The copy control program 2162 is for executing a process for storing copy-target data sent from the main site in a virtual page of the corresponding virtual volume. The volume management program 2163 is for executing a process for registering a copy pair setting based on copy pair setting information sent from the main site storage system 100. The ranking information management program 2165 is for managing ranking information sent from the main site storage system 100. The pool ranking information program 2167 is for updating the pool ranking management table 2176 when a new logical volume is created or there is a configuration change in the pool.

The pair management table 2171 is for managing pair status in units of volumes. The ranking information table 2172 is for managing ranking information for each virtual page of each virtual volume. The page tier information table 2175 is for storing the tier of an actual page when a new actual page has been allocated from the pool to a virtual page. Furthermore, in a case where an actual page to be allocated to a virtual page in accordance with Dynamic Tiering has been reallocated, the post-reallocation tier is stored. The pool ranking management table 2176 is for managing the ranking(s) of each tier. The virtual volume management table 2178 is for managing a virtual volume. The logical volume management table 2179 is for managing a logical volume (a pool volume).

Next, the tables stored in the memories 116 and 216 will be explained in detail.

FIG. 6A is a diagram showing an example of the configuration of a pair management table.

The pair management table 1171 correspondingly stores a primary volume storage ID 1171a, a primary volume virtual volume ID 1171b, a secondary volume storage ID 1171c, a secondary volume virtual volume ID 1171d, and a pair status 1171e.

The primary volume storage volume ID 1171a is the ID (storage ID) of the storage that stores the primary volume (the volume that will become the copy source). In this embodiment, this storage ID 1171a is the ID of the main site storage system 100. The primary volume virtual volume ID 1171b is the ID (virtual volume ID) of the virtual volume, which is the primary volume. The secondary volume storage ID 1171c is the ID (storage ID) of the storage that stores the secondary volume (the volume that will become the copy destination). In this embodiment, this storage ID 1171b is the ID of the remote site storage system 200. The secondary volume virtual volume ID 1171d is the virtual volume ID, which is the secondary volume. The pair status 1171e is the status (pair status) of a pair comprising a primary volume and a secondary volume. As pair statuses, there is PAIR, which denotes a state in which a data update is executed from the primary volume to the secondary volume, and PSUS, which denotes a state in which the copy pair relationship is maintained, but the data update to the secondary volume is cancelled. For example, the topmost record denotes a PAIR between a virtual volume with a virtual volume ID of "VOL01" in the storage system 100 with a storage ID of "01", and a virtual volume with a virtual volume ID of "VOL21" in the storage system 200 with storage ID "02", that is, a state in which a data update is executed between the primary volume and the secondary volume.

The pair management table 2171 of memory 216 has the same configuration and stores the same content as the pair management table 1171.

FIG. 6B is a diagram showing an example of the configuration of a ranking information table.

The ranking information table 1172 correspondingly stores a virtual volume ID 1172a, a virtual page number 1172b, and ranking information 1172c. The virtual volume ID 1172a is the ID of the virtual volume of the storage system 100. The virtual page number 1172b is the number of a virtual page in the virtual volume. The ranking information 1172c is the ranking number with respect to the corresponding virtual page. For example, the topmost record shows that a virtual page with a virtual page number of "1" in a virtual volume with a virtual volume ID of "VOL01" has a ranking number of "1".

The ranking information table 2172 of memory 216 has the same configuration and stores the same content as the ranking information table 1172.

FIG. 7A is a diagram showing an example of the configuration of a monitoring information table.

The monitoring information table 1173 correspondingly stores a virtual volume ID 1173a, a virtual page number 1173b, monitoring information 1173c, and a new page flag 1173d. The virtual volume ID 1173a is the ID of the virtual volume of the storage system 100. The virtual page number 1173b is the number of a virtual page in the virtual volume. The monitoring information 1173c is the number of I/Os with respect to the corresponding virtual page. The new page flag 1173d is a new page flag showing the monitoring information status with respect to the corresponding page. For example, the topmost record shows that the number of I/Os of a virtual page with a virtual page number of "1" in a virtual volume with a virtual volume ID of "VOL01" is 1000, and that the new page flag is "0".

Figure 7B:
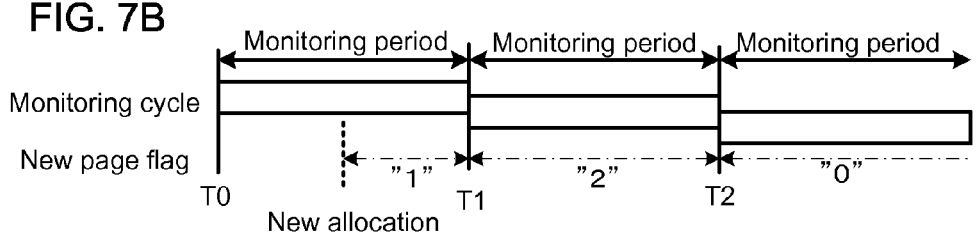
FIG. 7B is a diagram illustrating a new page flag.

FIG. 7B is a diagram illustrating the new page flag.

The new page flag is configured to "1" in a case where a new actual page has been allocated to a virtual page. The new page flag of "1" shows that the number of I/Os was not monitored during the entire monitoring period, denoting that the number of I/Os is not valid.

When an initial monitoring period (time T1) elapses subsequent to the allocation of a new actual page, the new page flag is updated from "1" to "2". A new page flag of "2" indicates that the number of I/Os have been being monitored since the start time of the monitoring period (time T1), but the number of I/Os will not be valid until the monitoring period (time T2) has elapsed. When the monitoring period (time T2) elapses, the new page flag is updated from "2" to "0". A new page flag of "0" indicates that the number of I/Os proportional to the monitoring period were monitored and the number of I/Os is valid.

FIG. 7C is a diagram showing an example of the configuration of an I/O information collection table.

The I/O information collection table 1174 correspondingly stores a virtual volume ID 1174a, a virtual page number 1174b, and monitoring information 1174c. The virtual volume ID 1174a is the ID of the virtual volume of the storage system 100. The virtual page number 1174b is the number of a virtual page in the virtual volume. The monitoring information 1174c is the number of I/Os with respect to the corresponding virtual page. For example, the topmost record shows that the number of I/Os with respect to the virtual page with the virtual page number of "1" in the virtual volume with the virtual volume ID of "VOL01" is "1000".

FIG. 8A is a diagram showing an example of the configuration of a page tier information table.

The page tier information table 1175 correspondingly stores a virtual volume ID 1175a, a virtual page number 1175b, and a storage tier 1175c. The virtual volume ID 1175a is the ID of the virtual volume of the storage system 100. The virtual page number 1175b is the number of a virtual page in the virtual volume. The storage tier 1175c is the number of the storage tier of the actual volume that has been allocated to the corresponding virtual page. For example, the topmost record shows that an actual page of a tier with a tier number of "1" has been allocated to a virtual page with a virtual page number of "1" in the virtual volume with a virtual volume ID of "VOL01".

The page tier information table 2175 of the memory 216 has the same configuration and stores the same content as the page tier information table 1175.

FIG. 8B is a diagram showing an example of the configuration of a pool ranking management table.

The pool ranking management table 1176 correspondingly stores a storage tier 1176a, a start ranking number 1176b, an end ranking number 1176c, and the number of pages per ranking 1176d. The storage tier 1176a is the tier number of the storage tier. The start ranking number 1176b is the number of the first (most significant) ranking (start ranking: refer to FIG. 2) of the corresponding tier. The end ranking number 1176c is the number of the final (least significant) ranking (end ranking) of the corresponding tier. The number of pages per ranking 1176d is the number of pages allocated to one ranking. For example, the topmost record shows that the start ranking number of the tier 1 is 1, the end ranking number is 4, and that four pages are allocated to a single ranking.

The pool ranking management table 2176 of the memory 216 has the same configuration as the pool ranking management table 1176, and stores information with respect to the tiers of the pool in the storage system 200.

FIG. 8C is a diagram showing an example of the configuration of a difference information table.

The difference information table 1177 correspondingly stores a virtual volume ID 1177a, a virtual page number 1177b, and a new difference page flag 1177c. The virtual volume ID 1177a is the ID of the virtual volume. The virtual page number 1177b is the number of a virtual page in the virtual volume. The new difference page flag 1177c stores a new difference page flag with respect to the corresponding virtual page. A new difference page flag of "ON" denotes that not one copy with respect to the corresponding virtual page has been carried out to the secondary side virtual volume, and a new difference page flag of "OFF" denotes that a copy with respect to the corresponding virtual page has been carried out to a virtual page of the secondary side virtual volume, that is, that an actual page is allocated to the secondary side virtual page.

FIG. 9A is a diagram showing an example of the configuration of a virtual volume management table.

The virtual volume management table 1178 correspondingly stores a virtual volume ID 1178a, a virtual page number 1178b, and a page ID 1178c. The virtual volume ID 1178a is the ID of the virtual volume. The virtual page number 1178b is a serial number for identifying a virtual page in the corresponding virtual volume. The page ID 1178c is the ID of the actual page allocated to the corresponding virtual page. Furthermore, in a case where an actual page has not been allocated to a virtual page, "unallocated" is configured in the page ID 1178c. For example, the topmost record shows that an actual page with a page ID of "P000" is allocated to a virtual page with a virtual page number of "1" in the virtual volume with the virtual volume ID of "VOL01".

FIG. 9B is a diagram showing an example of the configuration of a logical volume management table.

The logical volume management table 1179 correspondingly stores a logical volume ID 1179a, a logical page number 1179b, a page ID 1179c, and a status 1179d. The logical volume ID 1179a is the ID of a logical volume. The logical page number 1179b is a serial number for identifying a logical page in the corresponding logical volume. The page ID 1179c is the ID of an actual page corresponding to the logical page. The status 1179d is the status of the corresponding actual page. As page statuses, there is allocated, which denotes that the corresponding actual page is allocated to a virtual page, and unallocated, which denotes that the corresponding actual page is not allocated to a virtual page, that is, the actual page is a free page. For example, the topmost record shows that a logical page with a logical page number of "1" in a logical volume with a logical volume ID of "Logical VOL01" is an actual page with a page ID of "P000", and that this actual page is allocated to a virtual page.

Next, the operation of the computer system will be explained.

Figure 10A:
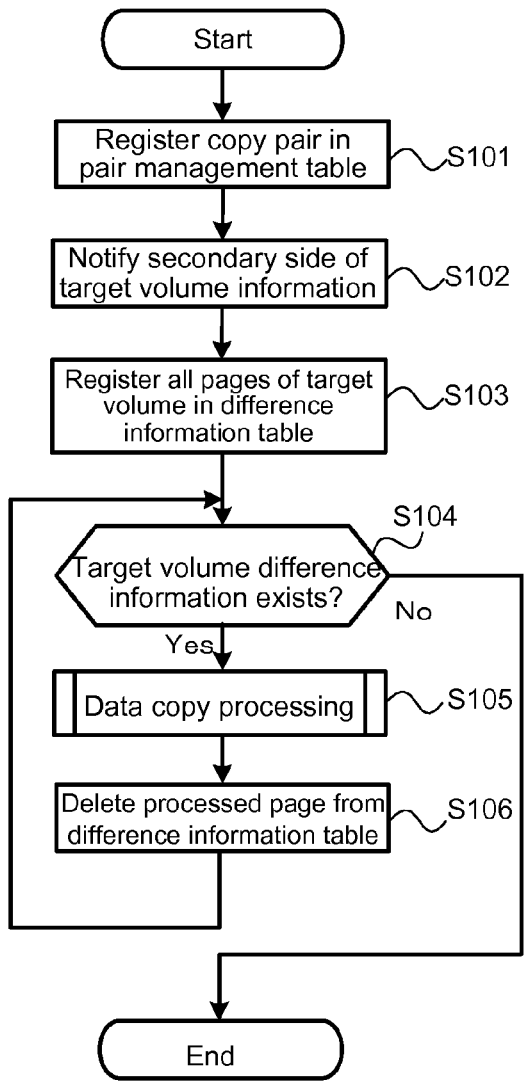
FIG. 10A is a flowchart of a copy pair creation processing in the primary-side storage system.

FIG. 10A is a flowchart of copy pair creation processing in the primary side storage system 100. A copy pair creation processing is carried out by the processor 114 executing the volume management program 1163.

In the management server 20, when a copy pair creation instruction by the operator specifying virtual volumes that are targeted to become a copy pair (a virtual volume of the copy-source storage system 100 and a virtual volume of the copy-destination storage system 200) is received, the management server 20 sends to the storage system 100 via the communication network 41 a copy pair creation instruction comprising pair information of the copy pair-target virtual volumes (target volume information).

In the primary side storage system 100, the processor 114 registers the virtual volume that will become the target of a copy pair in the pair management table 1171 based on the target volume information included in the copy pair creation instruction (Step S101). Next, the processor 114 notifies the secondary side storage system 200 of the target volume information via the communication network 43 (Step S102). Next, the processor 114 registers all the virtual pages of the copy pair-target copy-source virtual volume (primary volume) in the difference information table 1177 (Step S103). "ON" is configured in the new difference page flag 1177c of the difference information table 1177 here since copying with respect to the respective pages has not been carried out to the secondary side.

Next, the processor 114 determines whether or not there is difference information (a record) related to the page of the copy pair primary volume in the difference information table 1177 (Step S104), and in a case where there is no difference information (Step S104: NO), ends the processing since this signifies that copying has been carried out to the copy-destination virtual volume (secondary volume) with respect to all the pages of the primary volume.

Alternatively, in a case where there is difference information (Step S104: YES), the processor 114 executes data copy processing (refer to FIG. 13A) with respect to the relevant page (Step S105), deletes the difference information (record) of the processed page from the difference information table 1177 (Step S106), and continues carrying out the processing from Step S104. This process makes it possible to copy the data of the copy pair primary volume of the storage system 100 to the secondary volume of the storage system 200.

Figure 10B:
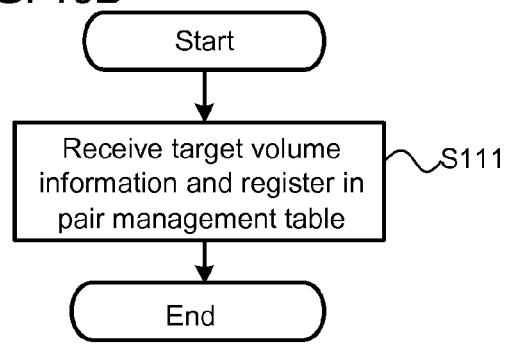
FIG. 10B is a flowchart of a copy pair creation processing in the secondary-side storage system.

FIG. 10B is a flowchart of copy pair creation processing in the secondary side storage system. A copy pair creation processing is carried out by the processor 214 executing the volume management program 2163.

In the secondary side storage system 200, when the processor 214 receives target volume information with respect to a copy pair from the storage system 100 via the communication network 43, the processor 214 registers the information of the copy pair-target volumes in the pair management table 2171 based on the target volume information (Step S111), and ends the processing. This makes it possible to discern the copy pair-target virtual volume in the secondary side storage system 200.

Figure 10C:
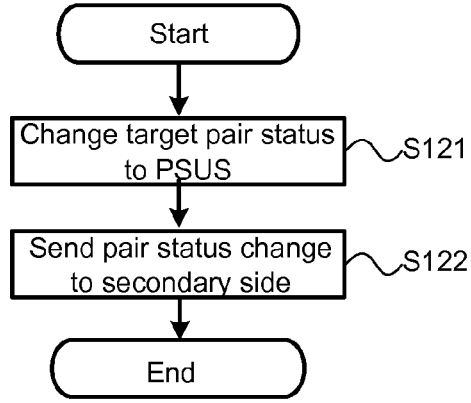
FIG. 10C is a flowchart of a copy pair splitting processing in the primary-side storage system.

FIG. 10C is a flowchart of copy-pair splitting processing in the primary side storage system. A copy pair splitting processing is carried out by the processor 114 executing the volume management program 1163.

In the management server 20, when a copy pair splitting instruction by the operator specifying virtual volumes (the virtual volume of the copy-source storage system 100 and the virtual volume of the copy-destination storage system 200) that are targeted for copy pair splitting is received, the management server 20 sends to the storage system 100 via the communication network 41 a copy pair splitting instruction comprising pair information of the copy pair splitting-target virtual volumes (target volume information).

In the primary side storage system 100, the processor 114 changes the pair status corresponding to the pair of virtual volumes that will become the copy pair splitting target to PSUS, which denotes a splitting state, in the pair management information table 1171 based on the target volume information included in the copy pair splitting instruction (Step S121). Next, the processor 114 notifies the secondary side storage system 200 via the communication network 43 that the pair status with respect to the target volumes changed to PSUS (Step S122), and ends the processing.

Figure 10D:
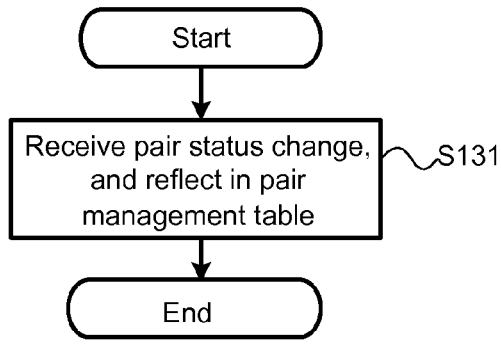
FIG. 10D is a flowchart of a copy pair splitting processing in the secondary-side storage system.

FIG. 10D is a flowchart of copy pair splitting processing in the secondary side storage system. A copy pair splitting processing is carried out by the processor 214 executing the volume management program 2163.

In the secondary side storage system 200, when the processor 214 receives the notification from the storage system 100 via the communication network 43 that the pair status of the copy pair was changed to PSUS, the processor 214 changes the pair status corresponding to the pair of target virtual volumes to PSUS in the pair management information table 2171 (Step S131), and ends the processing.

Figure 11A:
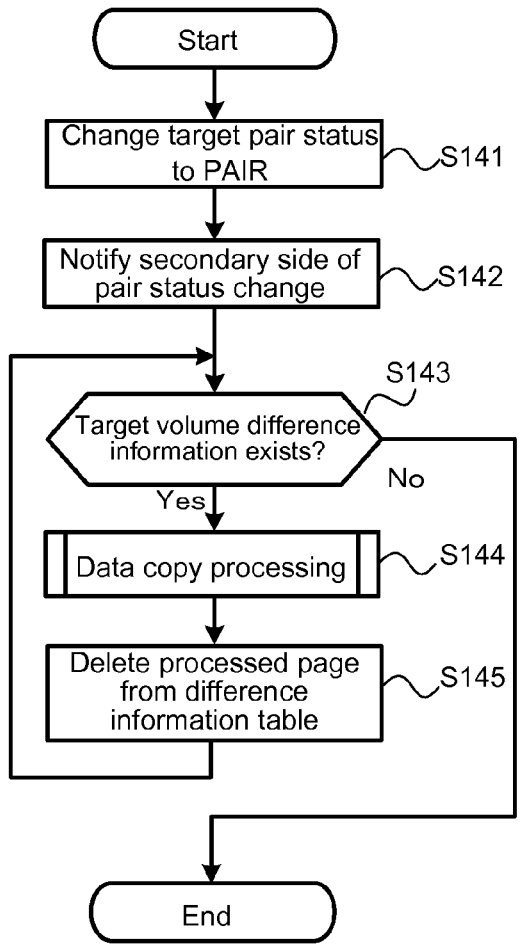
FIG. 11A is a flowchart of a resynchronization processing in the primary-side storage system.

FIG. 11A is a flowchart of resynchronization processing in the primary side storage system. A resynchronization processing is carried out by the processor 114 executing the volume management program 1163.

In the management server 20, when a copy pair resynchronization instruction by the operator specifying virtual volumes (the virtual volume of the copy-source storage system 100 and the virtual volume of the copy-destination storage system 200) that are targeted for copy pair resynchronization is received, the management server 20 sends to the storage system 100 via the communication network 41 a resynchronization instruction comprising pair information of the resynchronization-target virtual volumes (target volume information).

In the primary side storage system 100, the processor 114 changes the pair status corresponding to the pair of virtual volumes that will become the resynchronization target to PAIR, which denotes a synchronized state, in the pair management information table 1171 based on the target volume information included in the resynchronization instruction (Step S141). Next, the processor 114 notifies the secondary side storage system 200 via the communication network 43 that the pair status with respect to the target volumes has changed to PAIR (Step S142).

Next, the processor 114 determines whether or not there is difference information (a record) related to the virtual page of the resynchronization-target primary volume in the difference information table 1177 (Step S143), and in a case where there is no difference information (Step S143: NO), ends the processing since this signifies that all the pages of the primary volume are reflected in the copy-destination virtual volume (secondary volume).

Alternatively, in a case where there is difference information (Step S143: YES), the processor 114 executes data copy processing (refer to FIG. 13A) with respect to the relevant page (Step S144), deletes the difference information (record) of the processed page from the difference information table 1177 (Step S145), and continues carrying out the processing from Step S143. This process makes it possible to appropriately copy the data, which was updated when the copy pair primary volume of the storage system 100 was split from the pair, to the secondary volume of the storage system 200.

Figure 11B:
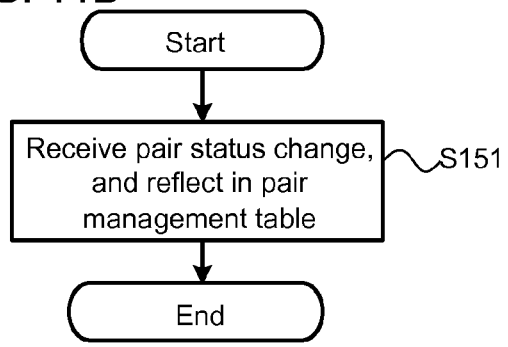
FIG. 11B is a flowchart of a resynchronization processing in the secondary-side storage system.

FIG. 11B is a flowchart of resynchronization processing in the secondary side storage system. A resynchronization processing is carried out by the processor 214 executing the volume management program 2163.

In the secondary side storage system 200, when the processor 214 receives a notification from the storage system 100 via the communication network 43 that the pair status of the copy pair was changed to PAIR, the processor 214 changes the pair status corresponding to the pair of target virtual volumes to PAIR in the pair management information table 2171 (Step S151), and ends the processing.

Figure 11C:
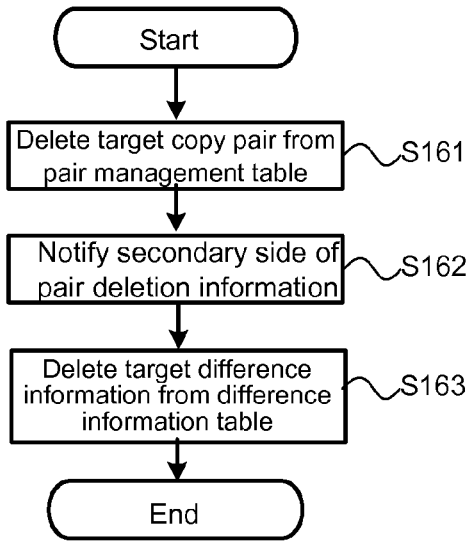
FIG. 11C is a flowchart of a copy pair deletion processing in the primary-side storage system.

FIG. 11C is a flowchart of copy pair deletion processing in the primary side storage system. A copy pair deletion processing is carried out in accordance with the processor 114 executing the volume management program 1163.

In the management server 20, when a copy pair deletion instruction by the operator specifying virtual volumes (a virtual volume of the copy-source storage system 100 and a virtual volume of the copy-destination storage system 200) that are targeted for copy pair deletion is received, the management server 20 sends to the storage system 100 via the communication network 41 a copy pair deletion instruction comprising pair information of the copy pair deletion-target virtual volumes (target volume information).

In the primary side storage system 100, the processor 114 deletes the copy pair record of the copy pair deletion-target virtual volumes from the pair management table 1171 based on the target volume information included in the copy pair deletion instruction (Step S161). Next, the processor 114 notifies the secondary side storage system 200 of the pair deletion information including the target volume information via the communication network 43 (Step S162). Next, the processor 114 deletes the difference information (record(s)) with respect to all the pages of the copy pair deletion-target primary volume from the difference information table 1177 (Step S163), and ends the processing. This makes it possible to appropriately delete the difference information with respect to a page that does not require copying from the difference information table 1177, and to appropriately prevent unnecessary copying.

Figure 11D:
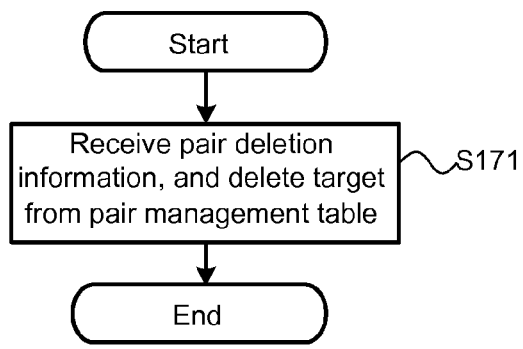
FIG. 11D is a flowchart of a copy pair deletion processing in the secondary-side storage system.

FIG. 11D is a flowchart of copy pair deletion processing in the secondary storage system. A copy pair deletion processing is carried out by the processor 214 executing the volume management program 2163.

In the secondary side storage system 200, when the processor 214 receives pair deletion information from the storage system 100 via the communication network 43, the processor 214 deletes the copy pair record of the volumes denoted by the target volume information from the pair management table 2171 based on the target volume information included in the pair deletion information (Step S171), and ends the processing.

Figure 12:
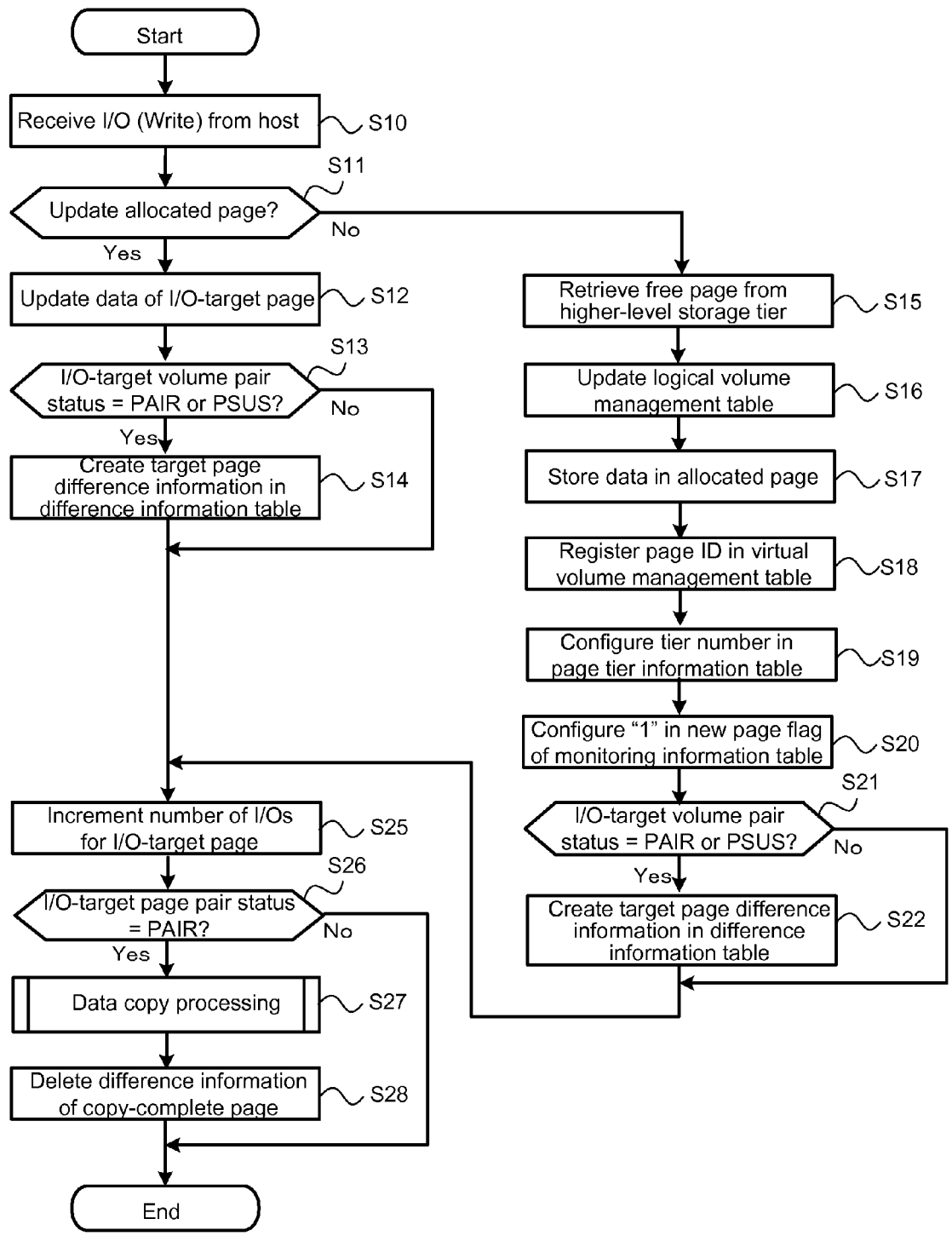
FIG. 12 is a flowchart of a host write processing in the primary-side storage system.

FIG. 12 is a flowchart of host write processing in the primary side storage system. A host write processing is carried out by the processor 114 executing the I/O control program 1161.

In the host 10, the processor that executes the application 13 creates an I/O request (a write request here) with respect to the storage system 100, and sends the I/O request to the storage system 100.

In the storage system 100, the processor 114 receives the I/O request via the communication network 40 (Step S10), and determines whether or not the I/O request in an update of a virtual page to which an actual page is allocated (Step S11). Specifically, the processor 114 identifies the I/O target (write destination) virtual volume and virtual page from the I/O request, refers to the virtual volume management table 1178, and determines whether or not the I/O request is an update of an actual page-allocated virtual page in accordance with whether or not a page ID has been allocated to the corresponding virtual page.

In a case where the result is an update with respect to an actual page-allocated virtual page (Step S11: YES), the processor 114 updates the actual page allocated to the I/O-target virtual page using the I/O-target data (Step S12).

Next, the processor 114 refers to the pair management table 1171 and determines whether or not the pair status of the I/O-target virtual volume is PAIR or PSUS (Step S13). In a case where the result of this is that the virtual volume pair status is either PAIR or PSUS (Step S13: YES), the processor 114 creates the difference information of the virtual page corresponding to the difference information table 1177 when none exists, configures the new page flag to "OFF" (Step S14), and moves the processing to Step S25, while in a case where the virtual page pair status is not PAIR or PSUS (Step S13: NO), moves to the processing of Step S25 without doing anything.

Alternatively, in a case where there the I/O request is not an update with respect to an actual page-allocated virtual page in Step S11 (Step S11: NO), the processor 114 retrieves a free page from a higher-level tier of the pool 131 (Step S15). Specifically, the processor 114 refers to the logical volume management table 1179 and retrieves a free actual page (that is, an unallocated actual page) from a higher-level tier logical volume.

Next, the processor 114 changes the status of the retrieved actual page to allocated in the logical volume management table 1179 (Step S16), stores the I/O-target data in the retrieved actual page (Step S17), and registers the page ID of the actual page in the page ID of the corresponding virtual page of the virtual volume management table 1178 (Step S18). In addition, the processor 114 configures the tier number of the retrieved actual page in the storage tier 1175c of the page tier information table 1175 corresponding to the I/O-target virtual page (Step S19), and configures "1" in the new page flag 1173d of the monitoring information table 1173 for the I/O-target virtual page (Step S20).

Next, the processor 114 refers to the pair management table 1171 and determines whether or not the pair status of the I/O-target virtual volume is either PAIR or PSUS (Step S21). In a case where the result of this is that the virtual volume pair status is either PAIR or PSUS (Step S21: YES), the processor 114 creates the difference information of the target virtual page in the difference information table 1177, configures the new page flag 1177c to "ON" (Step S22), and moves the processing to Step S25, while in a case where the virtual page pair status is not PAIR or PSUS (Step S21: NO), moves to the processing of Step S25 without doing anything.

In Step S25, the processor 114 increments (+1) the number of I/Os of the I/O-target virtual page of the I/O information collection table 1174, refers to the pair management table 1171, and determines whether or not the pair status of the I/O-target virtual volume is PAIR (Step S26). In a case where the result of this is that the virtual volume pair status is PAIR (Step S26: YES), this signifies that the I/O-target virtual page must by copied to the secondary volume, and as such, the processor 114 executes a data copy processing (refer to FIG. 13A) (Step S27), deletes the difference information of the copy-complete virtual page from the difference information table 1177 (Step S28), and ends the processing, while in a case where the virtual volume pair status is not PAIR (Step S26: NO), ends the processing without doing anything.

Figure 13A:
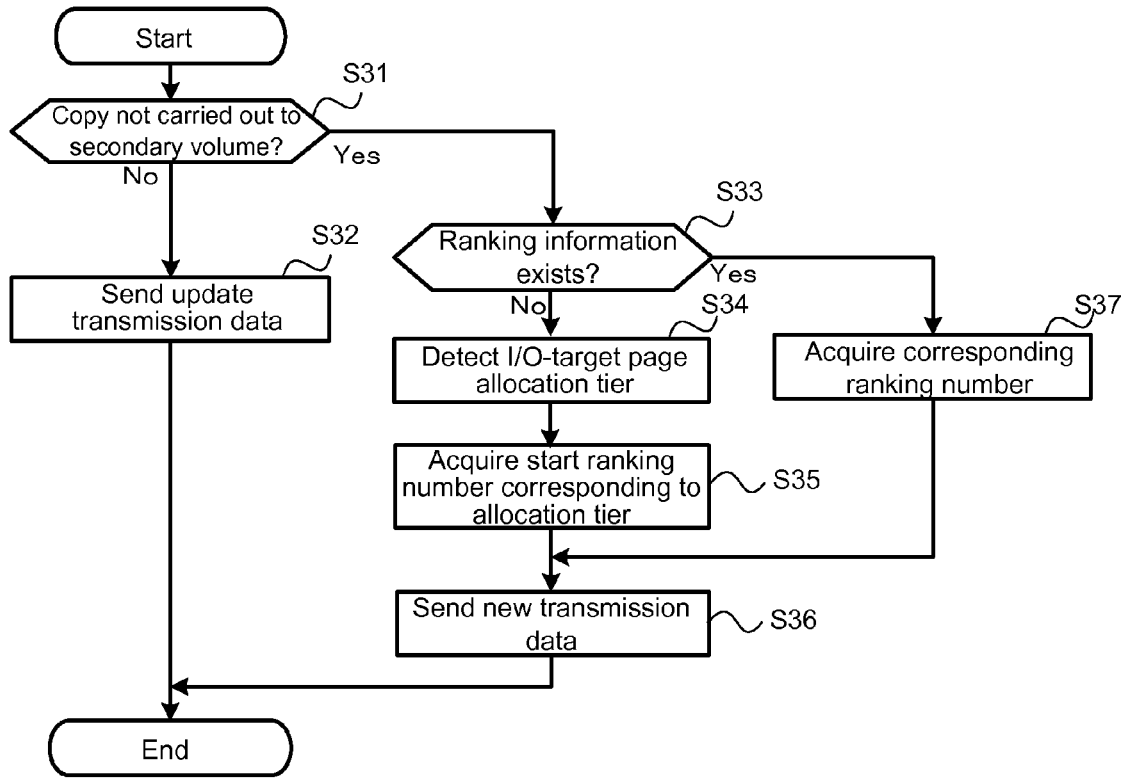
FIG. 13A is a flowchart of a data copy processing in the primary-side storage system.
Figure 13B:
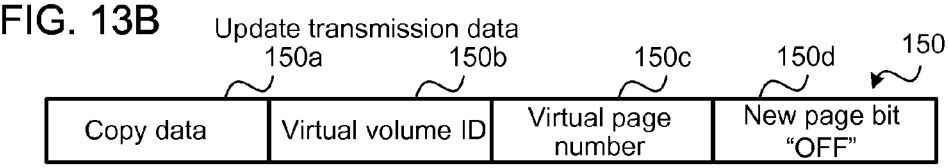
FIG. 13B is a block diagram of update transmission data.
Figure 13C:
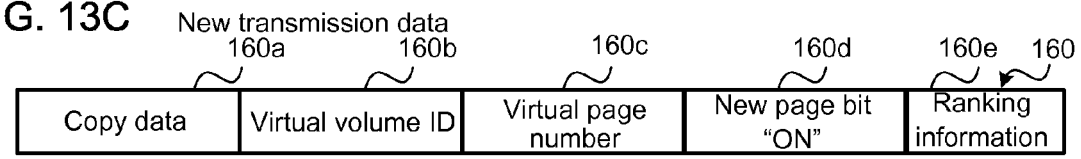
FIG. 13C is a block diagram of new transmission data.

FIG. 13A is a flowchart of data copy processing in the primary storage system. FIG. 13B is a block diagram of update transmission data. FIG. 13C is a block diagram of new transmission data. A data copy processing is carried out in accordance with the processor 114 executing the copy control program 1162.

In the storage system 100, the processor 114 refers to the new difference page flag 1177c of the difference information table 1177, and determines whether or not a copy to the secondary volume with respect to the I/O-target virtual page has yet to be implemented (Step S31).

In a case where the result of this is that a copy has been implemented, that is, a case in which the new difference page flag is "OFF" (Step S31: NO), the processor 114 sends copy-target data to the storage system 200 as update transmission data 150 (Step S32), and ends the processing. The update transmission data 150 here, as shown in FIG. 13B, comprises copy-target data (copy data) 150a, a virtual volume ID 150b for the copy-target virtual page, a virtual page number 150c for the copy-target virtual page, and a new page bit 150d. "OFF", which denotes that the virtual page is not the page (new page) to be copied anew on the secondary side, is configured in the new page bit 150d.

Alternatively, in a case where a copy has yet to be implemented, that is, a case in which the new difference page flag is "ON" (Step S31: YES), the processor 114 determines whether or not ranking information for the I/O-target virtual page exists in the ranking information table 1172 (Step S33).

In a case where the result of this is that I/O-target virtual page ranking information does not exist in the ranking information table 1172 (Step S33: NO), the processor 114 detects the tier number of the storage tier (allocation tier) in which the I/O-target virtual page has been allocated from the page tier information table 1175 (Step S34), acquires the start ranking number corresponding to the allocation tier from the pool ranking information table 1176 (Step S35), and moves the processing to Step S36. Alternatively, in a case where the result of this is that I/O-target virtual page ranking information does exist in the ranking information table 1172 (Step S33: YES), the processor 114 acquires the ranking number of the relevant ranking information (Step S37) and moves the processing to Step S36.

Figure 14:
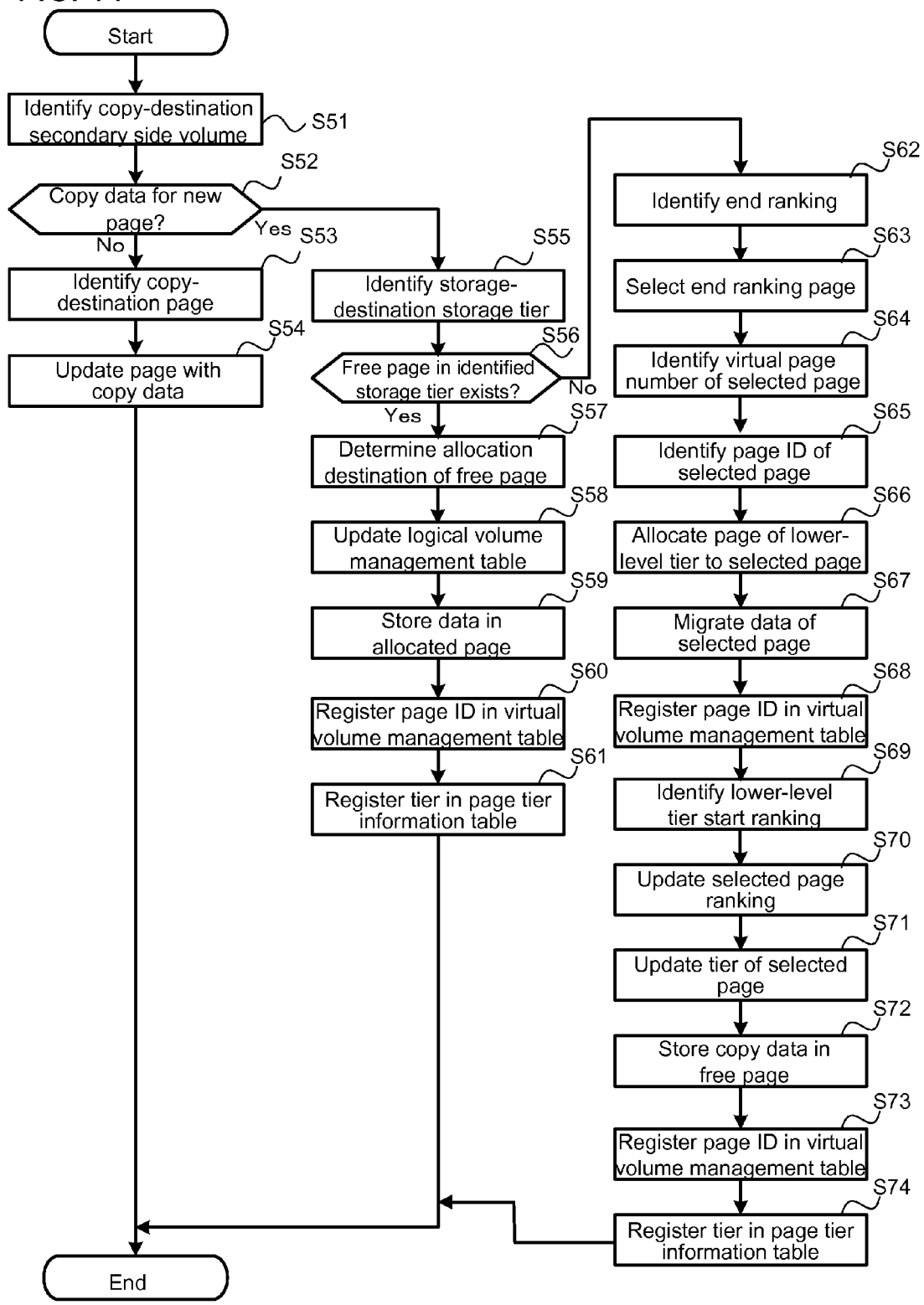
FIG. 14 is a flowchart of a data copy processing in the secondary-side storage system.

In Step S36, the processor 114 sends the copy-target data to the storage system 200 as new transmission data 160. The new transmission data 160 here, as shown in FIG. 13C, comprises copy data 160a, a virtual volume ID 160b for the copy-target virtual page, a virtual page number 160c for the copy-target virtual page, a new page bit 160d, and ranking information 160e. "ON", which denotes that the virtual page is the page (new page) to be copied anew, is configured in the new page bit 160d. Furthermore, the ranking number acquired in either Step S35 or Step S37 is configured in the ranking information 160e. When this processing is carried out, the data copy processing shown in FIG. 14 is executed in the remote site storage system 200. The above-described process makes it possible to appropriately send basic ranking information to the storage system 200 for deciding an actual page tier with respect to a virtual page to which an actual page is to be newly allocated.

Furthermore, the start ranking number corresponding to the allocation tier is treated as the new page ranking number, and in accordance with this, there may be cases in which the number of pages to which the start ranking number is allocated exceeds the number of pages allocatable per ranking, but the configuration may be such that an adjustment is made in this case so as to shift the ranking number of another page to a lower level to bring the number of pages within the number of pages allocatable per ranking.

Figure 13D:
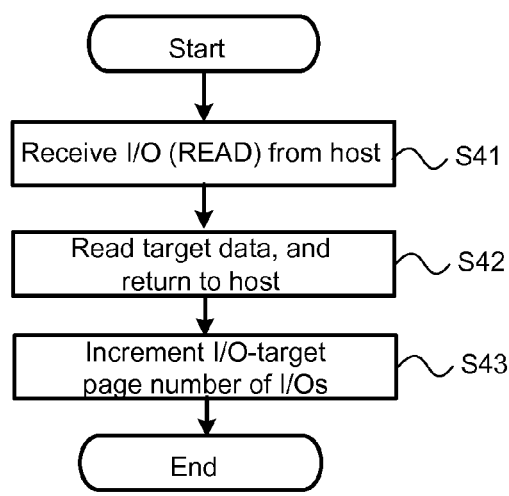
FIG. 13D is a flowchart of a host read processing in the primary-side storage system.

FIG. 13D is a flowchart of host read processing in the primary storage system. A host read processing is carried out by the processor 114 executing the I/O control program 1161.

In the host 10, the processor that executes the application 13 creates an I/O request (a read request here) with respect to the storage system 100, and sends the I/O request to the storage system 100.

In the storage system 100, the processor 114 receives the I/O request via the communication network 40 (Step S41), identifies the I/O target (read destination) virtual volume and virtual page from the I/O request, refers to the virtual volume management table 1178, reads data from the actual page corresponding to the ID of the page allocated to the corresponding virtual page, and returns the data to the host 10 (Step S42). Next, the processor 114 increments (+1) the number of I/Os of the corresponding virtual page in the I/O information collection table 1174 (Step S43), and ends the processing.

FIG. 14 is a flowchart of data copy processing in the secondary storage system. A data copy processing is carried out by the processor 214 executing the copy control program 2162.

In the secondary storage system 200, the processor 214, upon receiving either update transmission data 150 or new transmission data 160 via the communication network 43, acquires the target virtual volume ID from the received transmission data (either 150 or 160), refers to the pair management table 2171, and identifies the virtual volume ID of the secondary volume corresponding to the relevant target virtual volume ID (Step S51). Next, the processor 214 refers to the new page bit 150d in the transmission data, and determines whether or not the corresponding virtual page is the page (new page) to be newly copied (Step S52).

In a case where the corresponding virtual page is not the new page (Step S52: NO), the processor 214 acquires the virtual page number from the transmission data (the update transmission data 150 here), identifies the copy-destination virtual page number, and identifies the page ID corresponding to the virtual page number from the virtual volume management table 2178 (Step S53). In this embodiment, since the virtual page of the primary volume corresponds to the virtual page with the same virtual page number in the secondary volume here, the virtual page number in the transmission data becomes the copy-destination virtual page number. Next, the processor 214 updates the data of the actual page of the identified page ID to the copy data in the transmission data (Step S54), and ends the processing.

Alternatively, in a case where the corresponding virtual page is the new page (Step S52: YES), the processor 214 acquires the ranking number of the ranking information 160e from the new transmission data 160, refers to the pool ranking management table 2176, and identifies the tier corresponding to the acquired ranking number (Step S55).

Next, the processor 214 refers to the logical volume management table 2179, and determines whether or not a free page exists in the identified tier logical volume (Step S56). A page having unallocated as the status 2179d in the logical volume management table 2179 here denotes a free page. In a case where the result of this is that a free page exists in the identified tier (Step S56: YES), the processor 214 decides to allocate this free page to the copy-destination virtual page (Step S57), and updates the status corresponding to the relevant free page to allocated in the logical volume management table 2179 (Step S58). Next, the processor 214 stores the copy data within the new transmission data 160 in the relevant page (Step S59), and registers the page ID of the actual page in the page ID of the corresponding virtual page in the virtual volume management table 2178 (Step S60). In addition, the processor 214 configures the tier number of the identified tier in the storage tier 2175c of the page tier information table 2175 corresponding to the I/O-target virtual page (Step S61), and ends the processing.

Alternatively, in a case where a free page does not exist in the identified tier in Step S56 (Step S56: NO), the processor 214 refers to the pool ranking management table 2176, identifies the end ranking in the identified tier (Step S62), refers to the ranking information table 2172, selects the page of the identified end ranking (Step S63), and identifies the virtual page number of the page that was selected (selected page) (Step S64). Next, the processor 214 refers to the virtual volume management table 2178, and identifies the page ID (migration-source page ID) of the actual page (migration-source page) corresponding to the identified virtual page number (Step S65). Next, the processor 214 refers to the logical volume management table 2179, decides the page ID (migration-destination page ID) of the lower-level tier free page (migration-destination page) allocated to the selected page, and updates the status corresponding to the relevant free page (migration-destination page) to allocated (Step S66). The processor 214 migrates the data of the actual page of the migration-source page ID to the page of the migration-destination page ID (Step S67), and registers the migration-destination page ID in the page ID of the selected page in the virtual volume management table 2178 (Step S68).

Next, the processor 214 refers to the pool ranking management table 2176, identifies the start ranking number of the lower-level tier (Step S69), and updates the ranking information of the selected page to the start ranking number of the identified lower-level tier in the ranking information table 2172 (Step S70). In addition, the processor 214 updates the tier number of the selected page to the migration-destination page tier in the page tier information table 2175 (Step S71).

Next, the processor 214 stores the copy data in the free page (migration-source page) (Step S72), and moves the processing to Step S73.

Next, in Step S73, the processor 214 registers the page ID of the migration-source page in the virtual volume management table 2178 as the page ID of the copy-destination virtual page (Step S73), registers the tier number of the migration-source page in the copy-destination virtual page of the page tier information table 2175 (Step S74), and ends the processing.

Furthermore, in a case where a free page does not exist in the tier identified as the storage destination in the above processing (Step S56: NO), the processor 214 created a free page in the identified tier and allocated this free page to the copy-destination virtual page, but in a case where a free page exists in a higher-level tier than the identified tier, the processor 214 may allocate the free page of the relevant higher-level tier to the copy-destination virtual page.

Figure 15A:
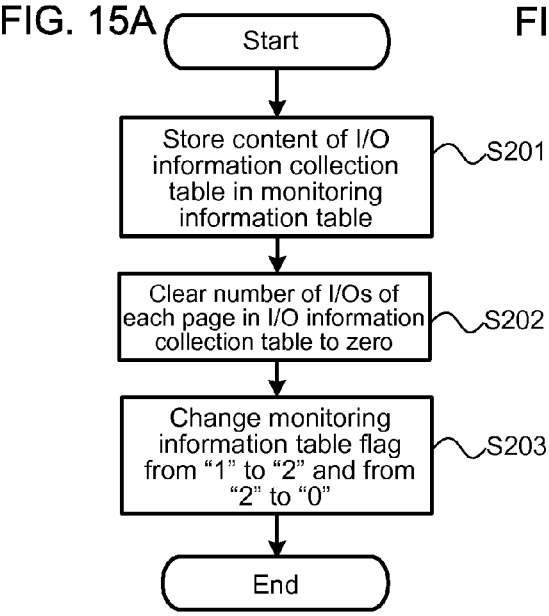
FIG. 15A is a flowchart of a monitoring information management processing in the primary-side storage system.

FIG. 15A is a flowchart of monitoring information management processing in the primary storage system. A monitoring information management processing is carried out in accordance with the processor 114 executing the monitoring information management program 1164. The monitoring information management processing is executed each time a prescribed monitoring interval (for example, six hours or one day) elapses.

When the prescribed monitoring interval elapses, the processor 114 stores the number of I/Os with respect to each virtual page of the I/O information collection table 1174 in the item corresponding to the monitoring information table 1173 (Step S201). Next, the processor 114 clears the number of I/Os to 0 with respect to each virtual page of the I/O information collection table 1174 (Step S202). Next, the processor 114 updates the new page flag "1" of the monitoring information table 1173 to "2", and, updates the "2" to "0" (Step S203). In accordance with this, the new page flag with respect to a virtual page for which the number of I/Os were able to be monitored during the entire monitoring period becomes "0", which denotes that monitoring was carried out for the entire monitoring period, and the new page flag with respect to the virtual page for which the number of I/Os will be able to be monitored from the beginning of the subsequent monitoring period will become "1", which denotes that monitoring is being carried out from the beginning of the monitoring period.

Figure 15B:
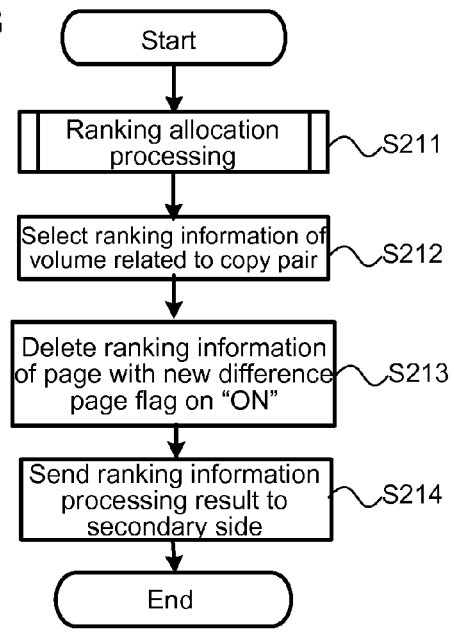
FIG. 15B is a flowchart of a ranking information management processing in the primary-side storage system.

FIG. 15B is a flowchart of ranking information management processing in the primary storage system. A ranking information management processing is carried out by the processor 114 executing the ranking information management program 1165. The ranking information management processing, for example, is executed immediately after the monitoring information management process has been executed.

The processor 114 executes a ranking allocation processing (refer to FIG. 16) (Step S211), and selects from the ranking information (record) of each virtual page of the ranking information table 1172 ranking information with respect to a virtual page of the virtual volume registered in the pair management table 1171 as the virtual volume related to a copy pair (Step S212). This makes it possible to reduce the amount of data by deleting the ranking information of a virtual page not related to a copy pair in the ranking information table 1172.

In addition, the processor 114 deletes, from among the selected virtual page ranking information, the ranking information of a virtual page with a new difference page flag that is "ON" in the difference information table 1177 (Step S213). This is because deleting the ranking information of a virtual page with a new difference page flag that is "ON" is not related to the reallocation of an actual page corresponding to a virtual page on the secondary side, which will be described further below, since copying has yet to be carried out to the secondary side virtual volume, that is, an actual page has not been allocated with respect to this virtual page. This makes it possible to reduce the amount of ranking information data.

Next, the processor 114 sends the ranking information of the remaining virtual page(s) collected in Step S212 to the secondary side storage system 200 (Step S214). In accordance with this processing, only ranking information related to a virtual page to which an actual page is actually allocated in the secondary volume is sent to the secondary side storage system 200.

Figure 15C:
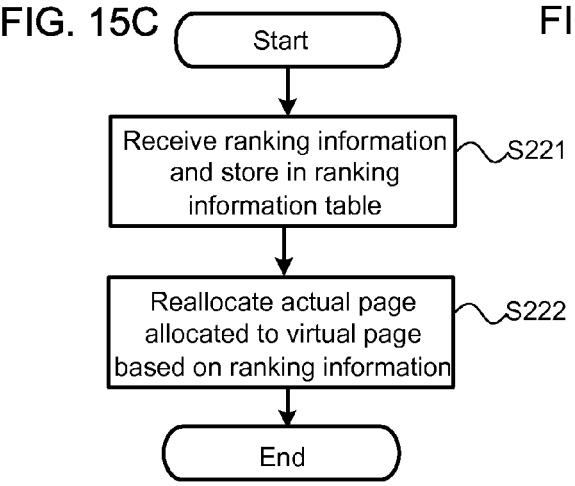
FIG. 15C is a flowchart of a ranking information management processing in the secondary-side storage system.

FIG. 15C is a flowchart of ranking information management processing in the secondary side storage system. A ranking information management processing is carried out by the processor 214 executing the ranking information management program 2165.

In the storage system 200, the processor 214 receives virtual page ranking information sent from the storage system 100, and stores this ranking information in the ranking information table 2172 (Step S221). Next, the processor 214 executes the reallocation of an actual page allocated to a virtual page such that a higher-level tier actual page is allocated to a virtual page that has a higher level ranking number based on the ranking numbers of the respective virtual pages of the ranking information table 2172 (Step S222). Furthermore, Dynamic Tiering technology can be used for the reallocation of the actual page allocated to the virtual page. This makes it possible for the allocation of the actual page of the virtual page in the storage system 200 to be the same as the allocation of the actual page of the virtual page in the storage system 100, or to approximate this allocation.

Figure 15D:
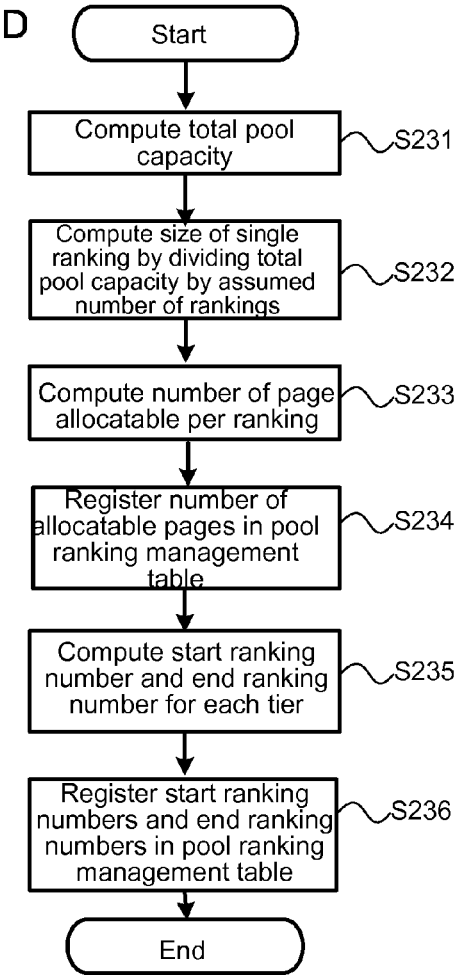
FIG. 15D is a flowchart of a pool ranking management processing in a storage system.

FIG. 15D is a flowchart of pool ranking management processing in a storage system. A pool ranking management processing is executed in both the primary side storage system 100 and the secondary side storage system 200. In the primary side storage system 100, the pool ranking management processing is carried out by the processor 114 executing the pool ranking management program 1165. In the secondary side storage system 200, the pool ranking management processing is carried out by the processor 214 executing the pool ranking management program 2165. This pool ranking management processing is executed in a case where a pool has been newly created, and a case where the configuration of the tiers and so forth in a pool has been changed. Hereinbelow, the processing in the primary side storage system 100 will be explained, but the same processing is also executed in the secondary side storage system 200.

In the storage system 100, the processor 114 computes the total storage capacity of the pool (the total pool capacity) by adding up the storage capacities of the respective tiers (Step S231). The storage capacities of the respective tiers here is stored in the memory 116 as a table that is not shown in the drawing.

Next, the processor 114 computes the size of the storage area allocated per ranking by dividing the total pool capacity by a presupposed number of rankings (Step S232). Next, the processor 114 computes the number of allocatable pages per ranking by dividing the storage area size per ranking by the page size (for example, 42 MB) (Step S233), and registers the number of allocatable pages in the pool ranking management table 1176 (Step S234). Next, the processor 114 uses the per-rank page size to find the start ranking number and the end ranking number of each tier (Step S235). Specifically, the start ranking number and the end ranking number of each tier can be computed using the formula shown below.

Tier 1 start ranking number=1,

Number of tier 1 rankings=tier 1 capacity/size per ranking,

Tier 1 end ranking number=number of tier 1 rankings,

Tier 2 start ranking number=tier 1 end ranking number+1,

Number of tier 2 rankings=tier 2 capacity/size per ranking,

Tier 2 end ranking number=tier 1 end ranking number+number of tier 2 rankings,

Tier 3 start ranking number=tier 2 end ranking number+1,

Number of tier 3 rankings=tier 3 capacity/size per ranking,

Tier 3 end ranking number=tier 2 end ranking number+number of tier 3 rankings

Next, the processor 114 registers start ranking number and end ranking number found for each tier in the pool ranking management table 1176 (Step S236), and ends the processing.

Figure 16:
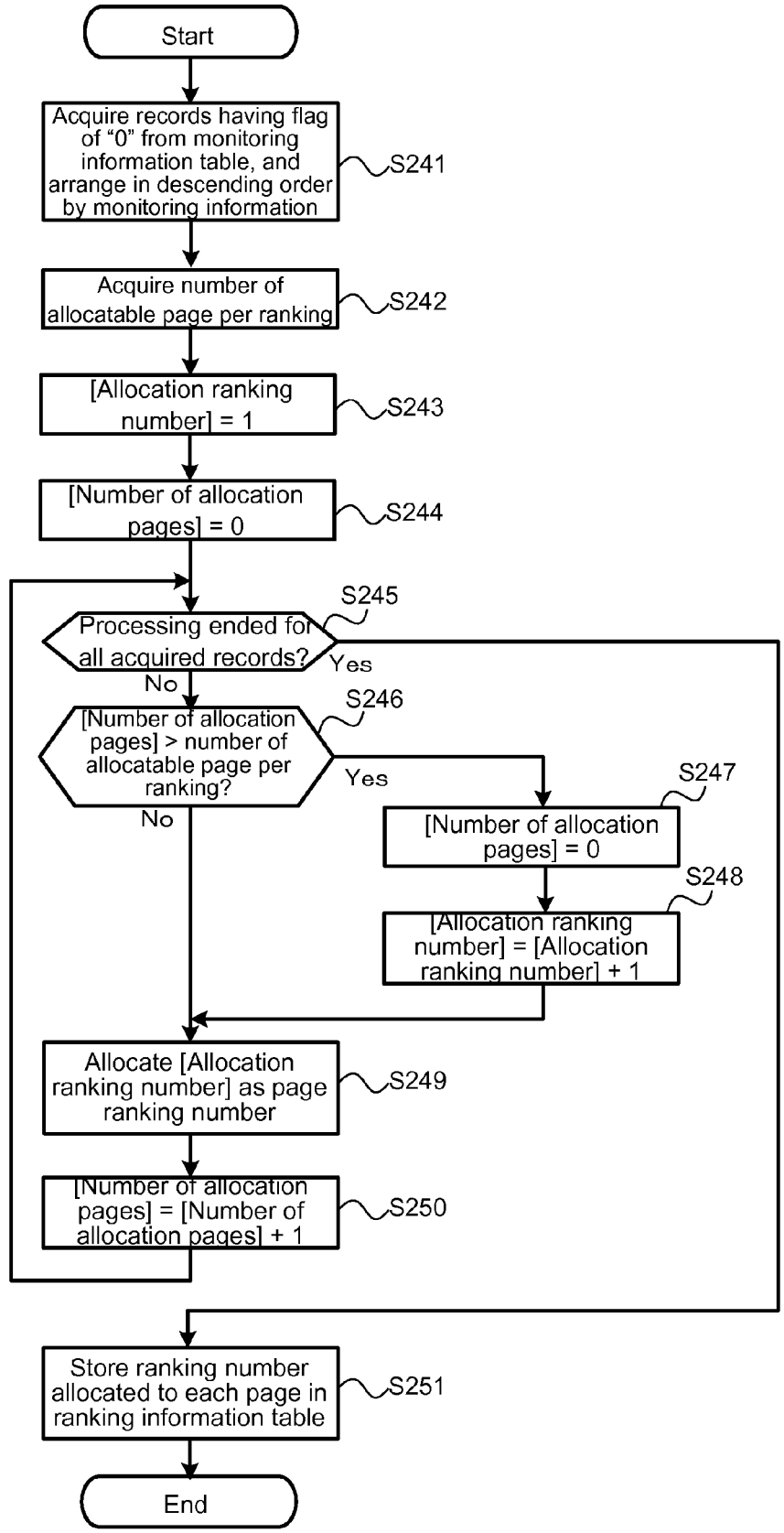
FIG. 16 is a flowchart of a ranking allocation processing in the primary-side storage system.

FIG. 16 is a flowchart of ranking allocation processing in the primary side storage system. A ranking allocation processing is carried out by the processor 114 executing the ranking allocation program 1166.

The processor 114 of the storage system 100 acquires records in which the new page flag is "0" from the monitoring information table 1173, and arranges these records in descending order by number of I/Os (Step S241). Since this step narrows down the records to those with new page flags of "0", a virtual page, which was not monitored throughout the entire monitoring period, that is, a virtual page for which the appropriate number of I/Os has not been obtained can be eliminated, making it possible to assign an appropriate ranking. Next, the processor 114 acquires the number of allocatable pages per ranking from the pool ranking management table 1176 (Step S242). Next, the processor 114 configures 1 in the [allocation ranking number] (work coefficient) (Step S243), and configures 0 in the [number of allocation pages] (work coefficient) (Step S244).

Next, the processor 114 determines whether or not processing has ended for all of the acquired records (Step S245). In a case where processing has not ended for all of the records (Step S245: NO), the processor 114 carries out the following processing by targeting the virtual page of the first record of the records for which processing has not been executed. The processor 114 determines whether or not the [number of allocation pages] has exceeded the number capable of being allocated per ranking (Step S246). In a case where the result of this is that the [number of allocation pages] exceeds the number capable of being allocated per ranking (Step S246: YES), the processor 114 configures the [number of allocation pages] to 0 (Step S247), configures the [allocation ranking number]+1 in the [allocation ranking number] (Step S248), and moves the processing to Step S249. Alternatively, in a case where the [number of allocation pages] does not exceed the number capable of being allocated per ranking (Step S246: NO), the processor 114 moves the processing to Step S249 without doing anything.

In Step S249, the processor 114 allocates the [allocation ranking number] as the virtual page ranking number of the record being targeted, stores this [allocation ranking number] in the memory 116 (Step S249), configures [number of allocation pages]+1 in the [number of allocation pages] (Step S250), and moves the processing to Step S245.

Alternatively, in a case where the processing has ended for all the acquired records (Step S245: YES), the processor 114 correspondingly stores the ranking number allocated to each page stored in the memory 116 in each page of the ranking information table 1172 (Step S251), and ends the processing. In accordance with the above processing, a ranking number is allocated in descending order from the virtual page with the highest number of I/Os, and, so that the number of pages allocated per ranking is a constant number.

The embodiment of the present invention has been explained hereinabove, but it goes without saying that the present invention is not limited to this embodiment, and that various changes are possible without departing from the gist thereof.

For example, in the above-described embodiment, multiple virtual pages are allocated per ranking, but the present invention is not limited to this, and, for example, only one page may be allocated per ranking. Furthermore, a ranking may be allocated to a virtual page such that the number of virtual pages allocated to each ranking becomes uniform based on the number of rankings.

REFERENCE SIGNS LIST

10 Host
20 Management server
30 Host
100 Storage system
200 Storage system

The invention claimed is:

1. A storage system comprising a first storage apparatus and a second storage apparatus,
    wherein the first storage apparatus comprising:
        a plurality of storage devices; and
        a first controller configured to:
            provide a first logical volume including a plurality of logical areas provided by the plurality of storage devices; and
            manage an access characteristics of each of the plurality of the logical area of the logical volume; and
            transmit an information corresponding to the access characteristics of the logical volume to the second storage apparatus,
    wherein the second storage apparatus comprising;
    a plurality of storage devices including a first type storage device and a second type storage device having different performance from the first type storage device; and
    a second controller configured to:
        manage a virtual volume, which is a copy pair of the logical volume, including a plurality of virtual areas;
        allocate a first storage area provided by the first type storage device to a first virtual area of the plurality of virtual areas in accordance with a write operation to the virtual volume;
        receive the information corresponding to the access characteristics of the logical volume from the first storage apparatus; and
        change an allocation to the first virtual area from the first storage area to a second storage area, which is provided by the second type storage device, referring to the information.

2. The storage system according to claim 1,
    wherein the first controller is configured to transmit the information periodically.

3. The storage system according to claim 1,
    wherein the information include an information regarding to an access frequency of each of the plurality of the logical areas during predetermined period.

4. The storage system according to claim 1,
    wherein the information is calculated based on a number of read/write operation with respect to each of the plurality of logical areas.

5. The storage system according to claim 1,
    wherein the plurality of storage devices of the first storage apparatus including a third type storage device and a forth type storage device having different performance from the third type storage device, and
    wherein the first controller is configured to:
        allocate a third storage area provided by the third type storage device to a first logical area of the plurality of logical areas in accordance with a write operation to the logical volume; and change an allocation to the first logical area from the third storage area to a forth storage area, which is provided by the forth type storage device, referring to the information.

6. The storage system according to claim 1,
wherein the second controller is configured to change the allocation to the first virtual area from the first storage area to the second storage area based on the access characteristics of the logical volume.

7. The storage system according to claim 1,
wherein the second controller is configured to change the allocation to the first virtual area from the first storage area to the second storage area referring to an access characteristics of logical area of the plurality of logical areas which corresponds to the first virtual area.

8. A method for managing storage system, the storage system including:
a first storage apparatus which comprises a first controller, and a plurality of storage devices; and
a second storage apparatus which comprises a second controller, and a plurality of storage devices including a first type storage device and a second type storage device having different performance from the first type storage device,
the method comprising:
providing a logical volume including a plurality of logical areas provided by the plurality of storage devices of the first storage apparatus;
managing an access characteristic of each of the plurality of the logical area of the logical volume;
providing a virtual volume, which is a copy pair of the logical volume, including a plurality of virtual areas:
allocating a first storage area provided by the first type storage device to a first virtual area of the plurality of virtual areas in accordance with a write operation to the virtual volume;
transmitting an information corresponding to the access characteristics of the logical volume from the first storage apparatus to the second storage apparatus; and
changing a storage area which allocated to the virtual area from the first storage area to a second storage area provided by the second type storage device referring to the information.

9. The method according to claim 8, further comprising transmitting the information periodically.

10. The method according to claim 8,
wherein the information include an information regarding to an access frequency of each of the plurality of logical areas of the logical volume during predetermined period.

11. The method according to claim 8, further comprising calculating the information based on a number of read/write operation with respect to each of the plurality of logical areas of the logical volume.

12. The method according to claim 8, further comprising changing the allocation of the storage area to the virtual volume based on the access characteristics of the logical volume.

13. The method according to claim 8, further comprising changing the allocation of the storage area, which is provided by the plurality of storage devices of the second storage apparatus, to the first virtual areas referring to an access characteristics of logical area of the plurality of logical areas which corresponds to the first virtual area.

14. A second storage apparatus coupled to a first storage apparatus which includes:
a plurality of storage devices; and
a first controller configured to:
provide a logical volume including a plurality of logical areas provided by the plurality of storage devices;
manage an access characteristics of each of the plurality of the logical area of the logical volume,
the second storage apparatus comprising:
a plurality of storage devices including a first type storage device and a second type storage device having different performance from the first type storage device; and
a second controller configured to:
manage a virtual volume, which is a copy pair of the logical volume, including a plurality of virtual areas;
allocate a first storage area provided by the first type storage device to a first virtual area of the plurality of virtual areas in accordance with a write operation to the virtual volume;
receive an information corresponding to the access characteristics of the logical volume from the first storage apparatus; and
change an allocation to the first virtual area from the first storage area to a second storage area, which is provided by the second type storage device, referring to the information.

15. The second storage apparatus according to claim 14,
wherein the second controller is configured to receive the information periodically.

16. The second storage apparatus according to claim 14,
wherein the information include an information regarding to an access frequency of each of the plurality of logical areas of the logical volume during predetermined period.

17. The second storage apparatus according to claim 14,
wherein the information is calculated based on a number of read/write operation with respect to each of the plurality of logical areas.

18. The second storage apparatus according to claim 14,
wherein the second controller is configured to change the allocation to the first virtual area from the first storage area to the second storage area based on the access characteristics of the logical volume.

19. The storage system according to claim 14,
wherein the second controller is configured to change the allocation to the first virtual area from the first storage area to the second storage area referring to an access characteristics of logical area of the plurality of logical areas which corresponds to the first virtual area.

* * * * *